United States Patent [19]
Renken et al.

[11] Patent Number: 5,967,661
[45] Date of Patent: Oct. 19, 1999

[54] TEMPERATURE CALIBRATION SUBSTRATE

[75] Inventors: Wayne Glenn Renken, San Jose, Calif.; Peter Michel Noel Vandenabeele, Lier, Belgium

[73] Assignee: Sensarray Corporation, Santa Clara, Calif.

[21] Appl. No.: 08/867,103

[22] Filed: Jun. 2, 1997

[51] Int. Cl.$^6$ .................................................... G01J 5/06
[52] U.S. Cl. ............................................ 374/126; 374/128
[58] Field of Search ............................... 374/10, 11, 126, 374/128, 131, 120, 121

[56] References Cited

U.S. PATENT DOCUMENTS

| | | | |
|---|---|---|---|
| 4,063,095 | 12/1977 | Wieder | 250/338 |
| 5,310,260 | 5/1994 | Schietinger et al. | 374/142 |
| 5,660,472 | 8/1997 | Peuse et al. | 374/128 |
| 5,830,277 | 11/1998 | Johngard et al. | 374/126 |

FOREIGN PATENT DOCUMENTS

WO 88/08965  11/1988  WIPO ............................ G01K 13/00

OTHER PUBLICATIONS

Timans, P., "Temperature measurement in rapid thermal processing", *Solid State Technology*, Apr. 1997, pp. 63–74.

*Primary Examiner*—Vit Miska
*Attorney, Agent, or Firm*—Wilson, Sonsini, Goodrich & Rosati

[57] ABSTRACT

An apparatus for measuring the temperature of an object within a process chamber is described. The process chamber includes a platform for receiving the object and an energy source for transferring energy to the object. The apparatus includes a shield, and a first and second energy sensor. The shield is positioned in the chamber adjacent the object to create an isothermal cavity in the space between the object and the shield. The shield is designed to receive from the energy source an amount of energy approximating that received by the object. The first energy sensor is positioned between the shield and the platform to measure the temperature of the object. The second energy sensor measures the temperature of the shield.

A method for establishing an isothermal condition within the process chamber includes the steps of varying the shield temperature in inverse relationship to the difference between the shield temperature and a target temperature. Then the temperature of the object is valued in inverse relationship to the difference between the temperature of a cavity sensor and the target temperature. When the readings are within a predetermined range of the target temperature an isothermal condition is indicated.

A method for monitoring the temperature of an object within the process chamber is also described. The method includes the steps of obtaining the coupling ratio for a cavity temperature sensor; obtaining the response time of the cavity temperature sensor and determining the temperature of the object $T_w$ on the basis of a formula which correlates the coupling ratio, the response time, and temperature readings of the shield and cavity.

23 Claims, 21 Drawing Sheets

TEMPERATURE CALIBRATION SUBSTRATE

BACKGROUND OF THE INVENTION

1. Field of the Invention

The present invention relates in general to sensor technology and more specifically to wafer temperature measurement and calibration for semiconductor device thermal fabrication processes.

2. Description of the Prior Art

The current state-of-the-art in Ultra Large Scale Integration (ULSI) allows mass production of integrated circuits (IC's) in silicon with millions of transistors on one single chip at an affordable cost. An example of a mass-produced IC at affordable cost is the INTEL Pentium® microprocessor which has over three million transistors. Currently, it is fabricated with 0.35 µm technology and there are plans to further reduce line width. A technology called Rapid Thermal Processing (RTP) has become a key for achieving improvements in smaller transistor dimensions and reduced connection resistance. In order to allow smaller transistor dimensions (0.5 µm and below) without short channel effects, very shallow junctions are necessary. RTP is currently a key technology in obtaining shallow junctions through the combination of a shallow ion implantation of As and B with a consecutive RTP step of approximately 1100° C. for 10 seconds.

An RTP system consists of a chamber lined with a highly reflective, low emissivity material, such as gold. At the top and bottom of the chamber, heat sources are positioned. These are typically tungsten-halogen lamps which radiate energy in a waveband from 0.5–3.5µm. Between the lamps, a central, processing portion of the chamber is formed by an upper and lower quartz barrier. The quartz barriers are transparent to radiation from the lamps. A silicon wafer is placed between the quartz barriers and processed. The silicon wafer is the only infrared absorbing object in the cavity, so a large amount of energy is coupled to the wafer, while the other parts of the chamber remain at a much lower temperature.

There are three major thermal processes in RTP: radiative thermal transport in the chamber; thermal conduction inside the wafer; and convective cooling of the wafer. In the process of manufacturing semiconductor devices various reactions such as oxidation, annealing, and chemical or physical vapor depositions occur on the surface of material being processed. Wafer temperature is a very influential parameter in controlling the physical properties of the material surface structure or films. As such, control of wafer temperature and uniformity of wafer temperature is a key parameter for achieving process control and uniformity.

The RTP presents a challenging environment for temperature monitoring and control. The semiconductor wafer has insignificant thermal mass. High levels of radiant energy can be focused on the wafer. Thus, wafer temperature can fluctuate rapidly and must be monitored closely.

Additionally, temperatures are likely to be non-uniform across the wafer surface. In an RTP oven the primary heating mechanism is radiant and thus wafer hot-spots are more likely. The hot spots can result either from localized peaks in the radiant energy of the lamps, or from differences in the emissivity of the semiconductor wafer surface.

Typically, wafer temperature control systems employ either of two wafer temperature sensing methods, namely contact method or non-contact methods. There are several techniques of contact method temperature sensing. One common technique is the use of contact sensors which measure the temperature of a body that the wafer rests on such as a hot plate. However, in environments of a moderate or high vacuum, the temperature difference between the body being sensed(hot plate) and the wafer is large enough to preclude accurate wafer temperature measurement. Another common technique is the use of a sensor which directly contacts the surface of the wafer. The major source of error associated with this technique is that there is often greater heat transfer between the wafer and the structure holding the sensor in contact with the wafer than between the wafer and the sensor itself. The attachment of a thermocouple to a wafer is another method of contact temperature measurement. The attachment of a thermocouple to a wafer historically has been achieved either by bonding the thermocouple to the surface of the wafer, or by imbedding it in the wafer. However, the impracticality of inserting thermocouples into production wafers limits the utility of thermocouple wafers in process control.

Of the non-contact methods of temperature measurement, radiation thermometry or pyrometry is the most widely utilized. Radiation pyrometry involves measuring long wavelength radiation from an object and making a temperature determination on the basis of that measurement. The technique has several disadvantages. Among these disadvantages is the reliance on a surface optical emissive properties which vary with temperature, doping level and film properties.

Temperature probes are available which have been calibrated to absolute temperature standards in an isothermal fluid bath. The sensors are deeply immersed in the bath so that conduction along the leads and the sensors structure is minimal and thus the measurement point or junction is independent from any external lead temperature. Unfortunately, the process environment in which these probes are utilized, i.e. an RTP oven is typically non-isothermal. Therefore most energy sensors have limited absolute temperature accuracy when measuring temperatures in a non-isothermal environment. The reason for this is that most sensors have a lead system or a support structure and thermal conduction along the leads or the support structures extracts heat or pumps heats into the measurement junction, thus altering the temperature measurement.

What is needed is temperature monitoring and control system suitable for temperature control in an RTP oven.

SUMMARY OF THE INVENTION

An apparatus for measuring the temperature of an object within a process chamber is described. Temperature measurement is enhanced by creating an isothermal region within the process chamber. The isothermal region promotes measurement accuracy by allowing probes calibrated under isothermal conditions, to be used in a process chamber which is also isothermal. Thus, a correlation between measured and absolute temperatures can be obtained. The process chamber includes means for supporting the object and an energy source for transferring energy to the object. The apparatus includes an energy absorbing and radiating shield, and first and second energy sensors. The shield is positioned in the chamber adjacent the object to create an isothermal chamber in the space between the object and the shield. The shield is designed to receive an amount of energy approximating that received by the object. The first energy sensor is positioned between the shield and the object to measure a temperature difference between the shield temperature and the temperature of the object. The second energy sensor measures the temperature of the shield. One or both first and second energy sensors may have been previously calibrated to an absolute temperature standard in an isothermal calibration system. They may also have been calibrated relative to each other in an isothermal furnace.

A method for establishing an isothermal condition within a process chamber between an object and a shield is also described. The process chamber includes a means to support the object, a shield and an energy source. The shield is positioned next to the object with a space between to create an isothermal temperature region. A first and second temperature sensor are mounted in between the shield and the object. The first temperature sensor is primarily responsive to the temperature of the shield and the second temperature is sensive to the temperature of the shield and the object. The energy source transfers energy to the object and the shield and energy is exchanged between the object and the shield across the cavity. The method includes the steps of:

selecting a target temperature at which to establish the isothermal condition;

obtaining a first temperature measurement corresponding to the shield temperature;

varying an energy level applied by the energy source to the shield in inverse relationship to the difference between the first temperature and the target temperature;

obtaining a second temperature measurement corresponding to a combination of the temperatures of the shield and the object;

varying the energy level applied by the energy source to the object in inverse relationship to the difference between the second temperature and the target temperature; and indicating an isothermal condition, when the first and the second temperature measurements are both within a predetermined range of the target temperature.

A method for establishing an absolute temperatue value for a third temperature sensor on an object within a process chamber, and external to the isothermal region between the object and the shield, is also described. The method includes the steps of:

selecting a target temperature;

obtaining a first temperature measurement corresponding to the shield temperature;

varying a power level applied by the energy source to the shield in inverse relationship to the difference between the first temperature and the target temperature;

obtaining a second temperature measurement corresponding to a combination of the temperature of the shield and the object;

varying the power level applied by the energy source to the object in inverse relationship to the difference between the second temperature and the target temperature; and obtaining a third temperature measurement from said third temperature sensor, when the first and the second temperature measurements are both within a predetermined range of the target temperature; and determining an offset value for the absolute temperature of the object measured by the third temperature sensor, such that said offset value corresponds to the difference between said third temperature measurement and said target temperature.

A method for monitoring the temperature of an object within the process chamber is also described. The method includes the steps of:

correlating the temperature of the shield, the object, and a first temperature sensor positioned between the shield and object to obtain a coupling ratio for the first temperature sensor;

correlating the time rate of change in the temperature of the first temperature sensor in relation to the temperature of said shield and the object to obtain the response time for the first temperature sensor; and determining the temperature of said object $T_w$ on the basis of a formula correlating the coupling ratio, the response time, and readings obtained from the first and second temperature sensors.

DESCRIPTION OF THE PREFERRED EMBODIMENTS

The present invention provides a method and apparatus for precisely monitoring and controlling semiconductor wafer temperature in a rapid thermal processing environment. The invention includes apparatus and method for measuring and displaying temperature variations across a semiconductor wafer resulting from non-uniform energy distibutions, such as those encountered in an RTP oven. A method is disclosed for calculating an offset constant to convert the temperature variations from a relative to an absolute value. The invention further comprises apparatus and method for establishing an isothermal equilibrium condition in a rapid thermal process oven. The invention additionally, includes a temperature monitoring apparatus for remotely monitoring semiconductor wafer temperatures, under the non-isothermal conditions experienced during IC fabrication.

Figure 1:
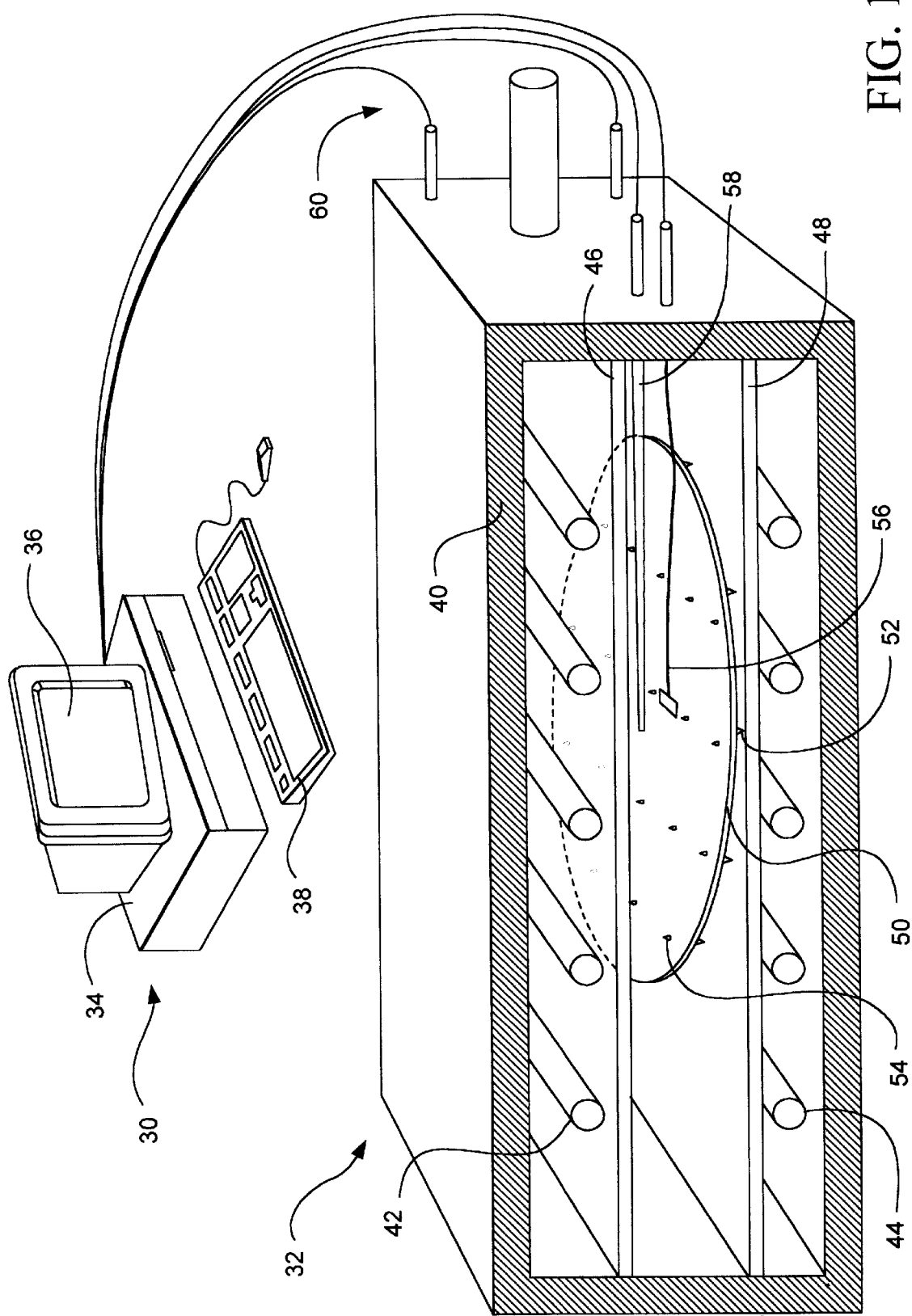
FIG. 1 is an overall hardware block diagram of a rapid thermal processing oven including a temperature control system.

FIG. 1 shows the hardware associated with monitoring and controlling temperature in a rapid thermal processing oven. The hardware shown comprises a control unit 30, a rapid thermal processing oven 32 and connections 60, between the control unit and the oven. Control unit 30 includes processor and memory 34, display 36 and user input 38. The instrumented oven 32 comprises a housing 40, upper radiant heaters 42, lower radiant heaters 44, upper transparent window 46, lower transparent window 48, shield 50, shield probe 56 and cavity probe 58. Shield 50 includes upper stand offs 54 and lower stand offs 52.

The interior surface of the oven housing 40 is highly reflective, i.e., gold coated. The upper and lower heater elements 42, 44, are typically tungsten-halogen lamps which emit infrared radiation in a waveband from 0.5 to 3.5 $\mu$m. As will be apparent to one skilled in the art, radiant energy may come from any arrangement of heaters, i.e., upper only, upper/lower, lower only, or external heaters with focusing/reflecting elements within the oven. The transparent shields 46 and 48 are typically fabricated from quartz and are transparent to radiation in the waveband emitted by the lamps. The only infrared absorbing object in the cavity is the shield 50. The shield is typically fabricated from the same material, with the same emissivity and thermal mass as the semiconductor wafer to be processed. The purpose of the shield is to provide a relatively stable, thermally symmetrical, temperature sensing environment between the shield and the calibration or process wafers. Ideally the cavity formed between the shield and the calibration or process wafers is isothermal. Several conditions must be fulfilled in order for the cavity to be isothermal. First, the purpose of the shield is fulfilled notwithstanding the heater configuration, so long as equivalent radiant, convective, or conductive energy is directed on both the calibration or process wafer and the shield. Second, the isothermal geometry must be deep enough so that the immersion depth of the sensor(s) allows for insensitivity to external lead temperatures. By creating this isothermal chamber and by having the sensor(s) traverse the interior of this isothermal region, probes that were previously calibrated to National Institute of Standards and Technology (N.I.S.T.) standards can be used to provide absolute temperature values. Third, the shield preferably has thermal characteristics, equivalent to the process wafers which will be used in the process. These thermal characteristics include, emissivity, conductivity, thermal mass, etc. The shield is equipped with lower standoffs 52 which maintain a spacing between the shield and the lower transparent window 48. The upper surface of the shield is also equipped with upper standoffs 54 to maintain a spacing between the shield and a semiconductor calibration or process wafers. The plane formed by the tops of all the upper standoffs is the staging platform on which a calibration or process wafer will rest. As will be obvious to those skilled in the art, the upper and lower standoffs can be replaced with numberous other support structures. Ideally, the number of supports is limited to a three point support structure. That structure can come up through a hole in the shield. Alternately, upper and lower standoffs can be replaced by three point supports which protrude horizontally from the walls of the housing. These would hold the shield and the object, spaced apart from one another and from the upper and lower transparent quartz windows.

Two temperature sensing probes are located above the shield. Each has a different degree of thermal coupling to the shield. By thermal coupling, is meant the extent to which the probe responds solely to the temperature of a given object to which it is coupled as opposed to other surrounding objects. As shown, shield probe 56 is thermally, tightly coupled to the shield and is in conductive contact with the shield. Cavity probe 58 is thermally, loosely coupled to the shield, i.e., is positioned off the surface of the shield. Both the shield and cavity probes are connected by leads insulated with quartz micro tubing, silica sleeving or for lower temperatures, Teflon sleeving. Upper and lower heaters 42, 44 respectively, shield probe 56 and cavity probe 58, are all connected via couplings 60 to control unit 30.

Figure 2:
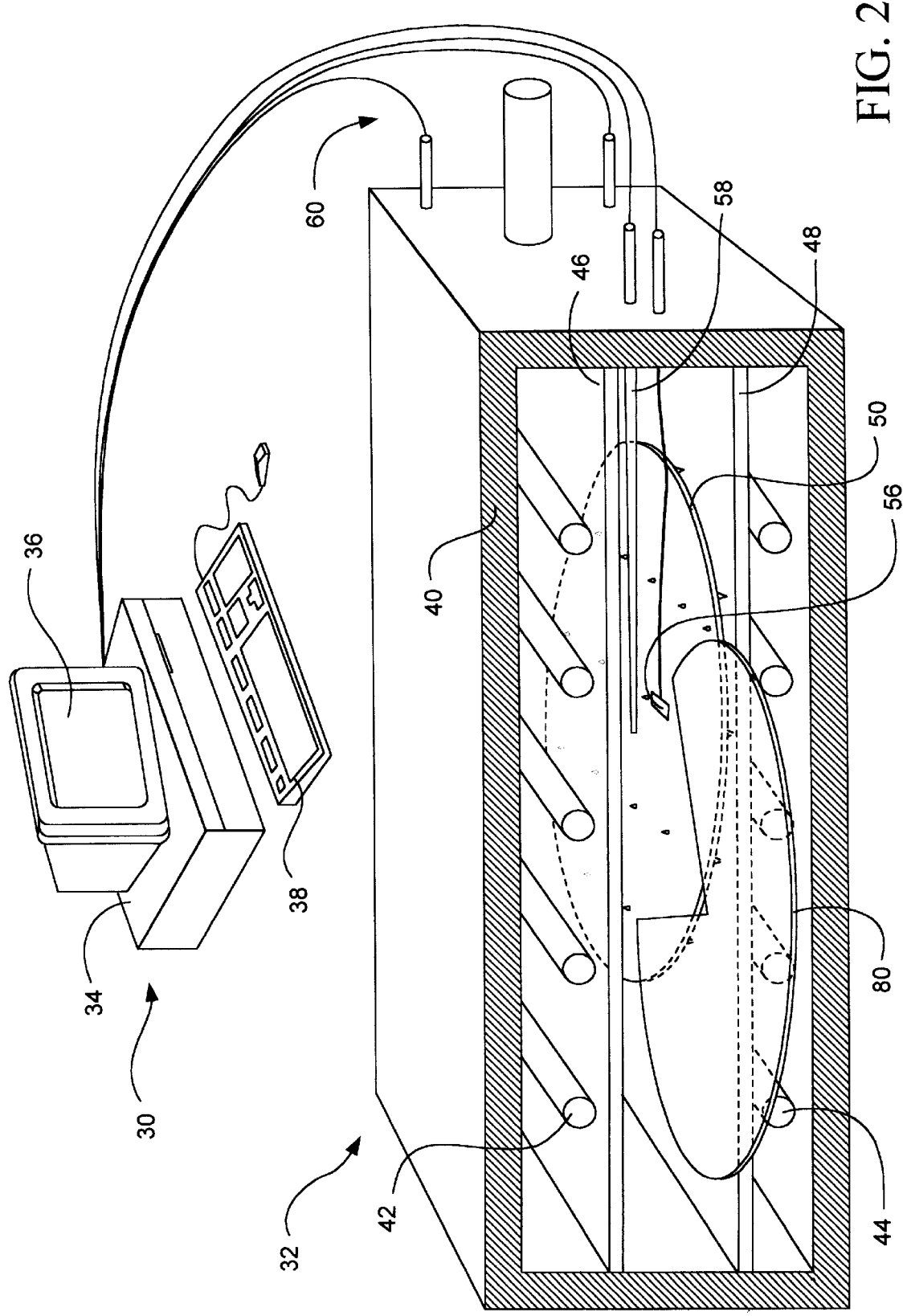
FIG. 2 is a hardware block diagram of the rapid thermal processing system of FIG. 1 and a semiconductor wafer for processing.

FIG. 2 shows the rapid thermal process oven and instrumentation 32 under operating conditions, with a semiconductor wafer 80 being inserted into the oven. The wafer rests on standoffs 54 which separate it from the shield 50. The standoffs are ideally fabricated from an insulating material, which is transparent to the radiant energy. Thus, they do not serve as a heat transfer path between the shield and the wafer. The oven is assumed to have been calibrated. The method and apparatus associated with oven calibration and will be discussed in FIGS. 3–19, and the accompanying text. Semiconductor wafer 80 is placed in the rapid thermal process oven on the upper standoffs 54. The upper standoffs 54 are of sufficient height to position cavity probe 58 equidistant from semiconductor wafer 80 and shield 50.

Ideally the shield and wafer temperatures are equivalent. One way to achieve this result is to match the thermal characteristics or thermal profile of the shield and the wafers being processed. For example, if the wafers being processed are silicon, then the shield is silicon. Alternately, if the wafers being processed are gallium arsenide, then the shield is gallium arsenide. Additionally, the lower surface of the shield can be patterned in such a manner as to duplicate the average emissivity of the upper surface of the semiconductor wafer being processed. Similarly, the interior surfaces of the shield can be coated to match the emissivity of the semiconductor wafer.

Figure 3:
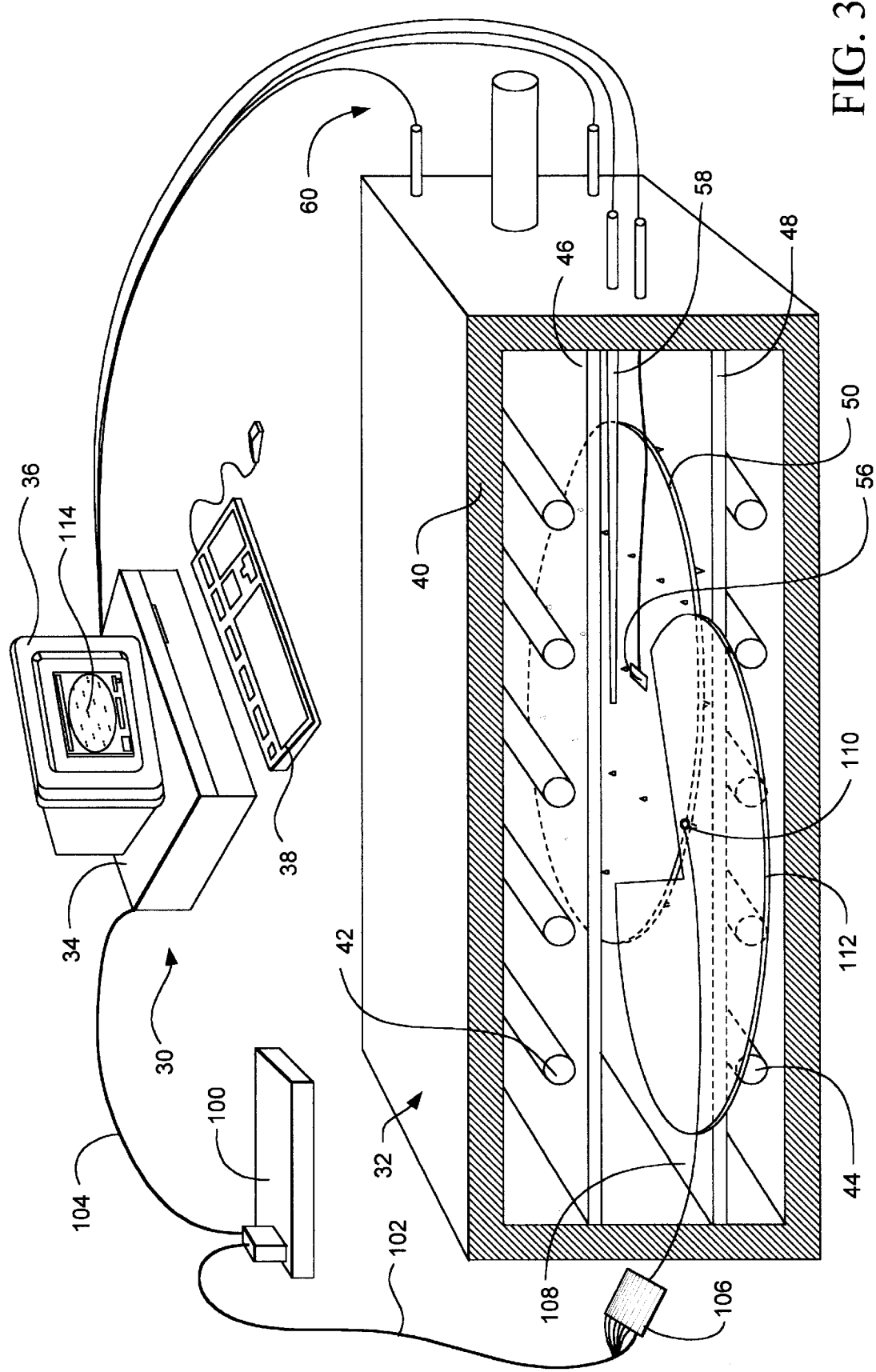
FIG. 3 is an overall system diagram of the rapid thermal processing oven of FIG. 1 and a temperature calibration wafer.

In FIG. 3, an overall hardware block diagram including the controller, oven and a calibration wafer 112 is shown. Calibration wafers are semiconductor wafers instrumented with thermocouples, resistive temperature sensors, or other temperature indication devices. These are routinely used in the semiconductor industry to calibrate RTP ovens for semiconductor fabrication. When equipped with multiple probes, these calibration wafers can also be utilized to indicate the expected temperature distribution that will be experienced in a specific oven, by a specific semiconductor wafer type, during processing of the wafer. Typically, calibration wafers, have been reliable indicators of relative temperatures across the wafer surface. They have not however, been reliable indicators of absolute temperatures, due to the non-isothermal conditions encountered in different ovens. As will be disclosed and discussed in connection with FIGS. 4–10, the current invention provides a method and apparatus for determining an offset factor to allow the relative temperatures indicated by the probe(s) on the instrumented wafer 112 to be converted to an absolute temperature value.

The apparatus shown in FIG. 3 is identical to that shown in FIG. 1 and additionally includes an interface unit 100, a calibration wafer 112, and a thermocouple 110 closely coupled to the upper surface of calibration wafer 112. The thermocouple 110 is connected by means of an insulated lead wire 108 and an external lead 102 to interface unit 100. Interface unit 100 is connected to controller 130 by means of lead 104. Between leads 102 and 108 is a thin flat insulated section 106. This insulated section is shaped and constructed so as to allow the probe lead(s) to pass to the outside by being compressively clamped by an elastomeric seal between the oven door (not shown) and housing during a temperature calibration. The insulated section can be fabricated from two pieces of polyamid insulation with lead wire(s) arrayed in parallel lines between the pieces. The interface unit 100 is associated with each calibration wafer. The interface unit contains an A/D converter, a microprocessor, a conversion table, and a calibration wafer ID table. The interface unit is able to recognize which calibration wafer is being utilized on the basis of a unique ID device which is contained in a connector that interconnects external lead 102 to interface 100. The connector ID device has a pin-code that uniquely identifies the calibration wafer 112. The interface unit acquires accurate wafer temperature readings from a plurality of probes on the wafer and digitizes these readings. The readings are sent to the controller 30 with the I.D. code. This code is matched to a calibratoin table and the floating point temperature value is calculated. To each reading from the interface unit is added an offset value stored in the conversion table for each calibration wafer. The offset value corresponds to the difference between the relative and absolute temperature registered by each probe on the calibration wafer. After offset adjustment the corrected digitized readings are stored displayed and analyzed. Probe results are displayed as screen graphics 114 on the display 36 of the control unit 30. The method and apparatus shown in the following FIGS. 4–10 will indicate how the offset is determined.

Figure 4:
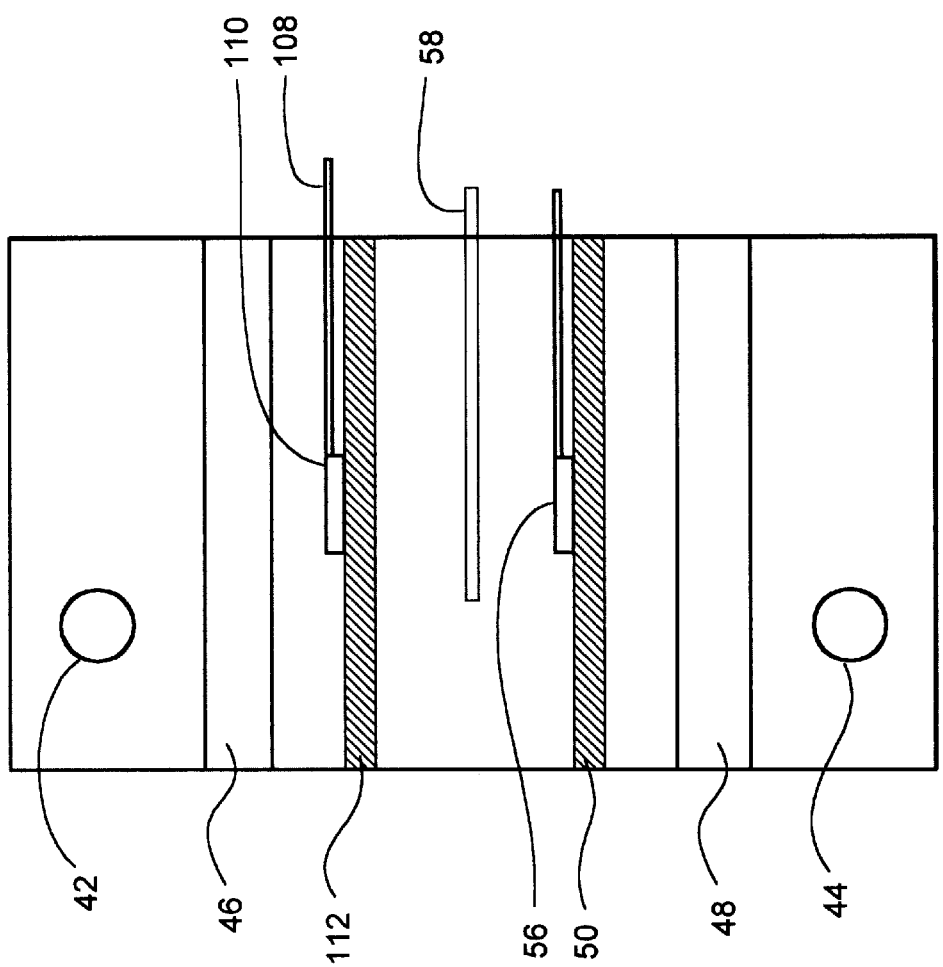
FIG. 4 is a cross-sectional view of the rapid thermal processing oven shown in FIG. 3.

FIG. 4 is cross-sectional view of a portion of the rapid thermal process oven shown in FIG. 3. The view includes upper and lower heaters 42, 44 respectively. Separating the upper and lower heaters from the center of the oven are upper 46 and lower 48 transparent windows. An isothermal cavity is defined between the calibration wafer 112 and the shield 50. Within the isothermal cavity is the shield probe 56 which is closely coupled to the shield and the cavity probe 58 which is shown position equidistant from the shield and the calibration wafer. On the upper surface of the calibration wafer, outside the isothermal cavity, is the calibration probe 110.
Isothermal FIGS. 5–8 will show the method for creating an isothermal equilibrium condition in the RTP oven and for loading interface unit 100 with an offset corresponding to the difference between the temperature indicated by thermocouple 110 and the absolute temperature of the calibration wafer 112. The method is equally, applicable when more than one calibration probe is present on calibration wafer 112.

Figure 5:
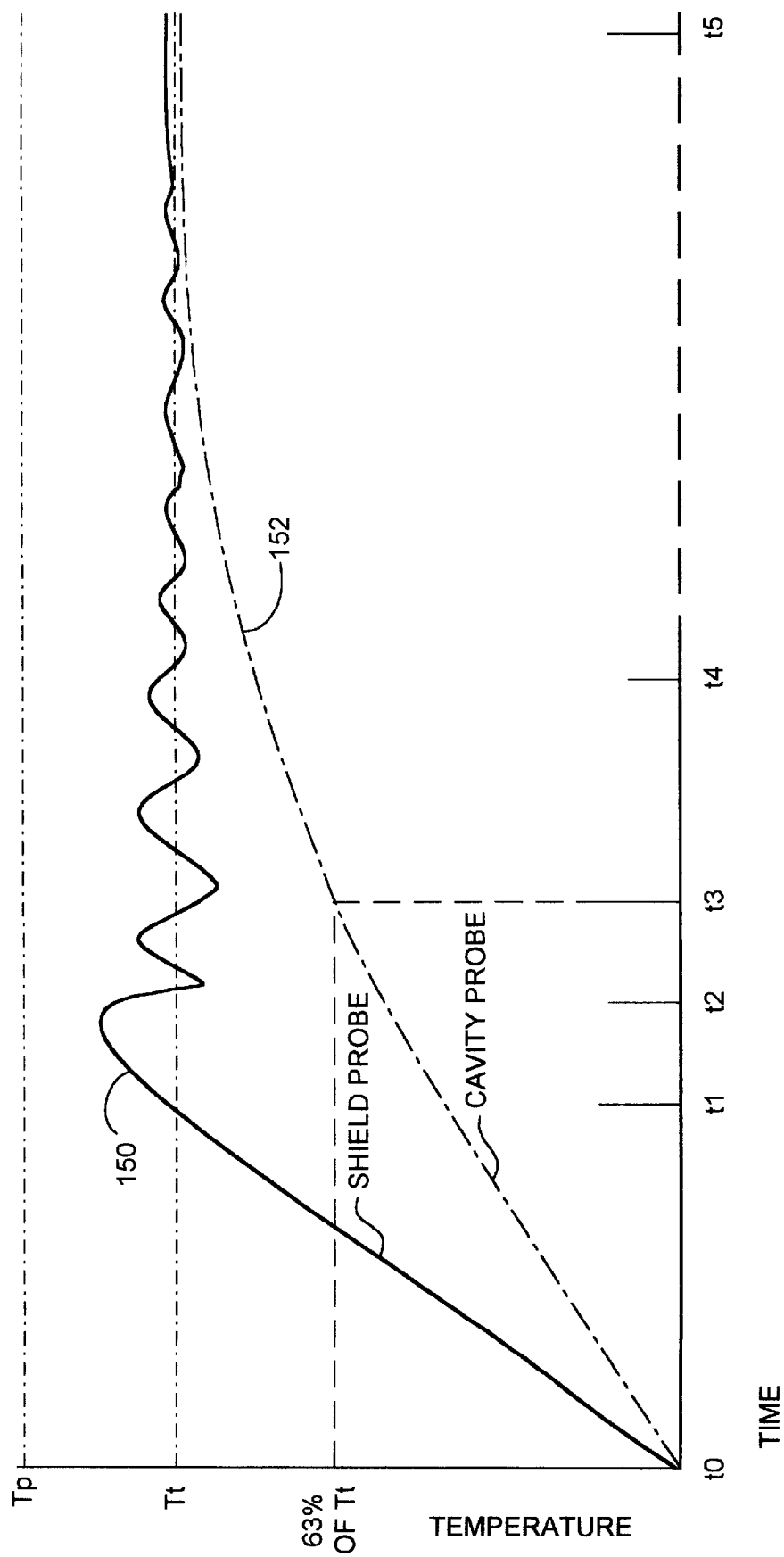
FIG. 5 is a graph showing temperature probe read-outs corresponding to an isothermal equilibrium.

FIG. 5 is a graph showing the temperatures registered by the shield probe 56 and the cavity probe 58 during the establishment of an isothermal equilibrium. Time is plotted on a horizontal axis and temperature on a vertical axis. Waveforms 150 and 152 representing respectively the temperature indicated by the shield probe 56 and cavity 58 probe are shown. An isothermal condition is established about a target temperature (Tt). At time t0, the shield and cavity probes register an ambient temperature. Shield probe exhibits a linear rate of rise from time t0 through t1. At time t1, the shield probe indicates the target temperature. From time t1 onward the shield probe registers decreasing fluctuations centered at the Tt. The cavity probe which is loosely coupled to both the shield and calibration wafers experiences an exponential rate of rise commencing at time t0. At time t3, the cavity probe has reached a temperature which is 63% or $(1-e^{-\tau})$ or of the target temperature.

Figure 6:
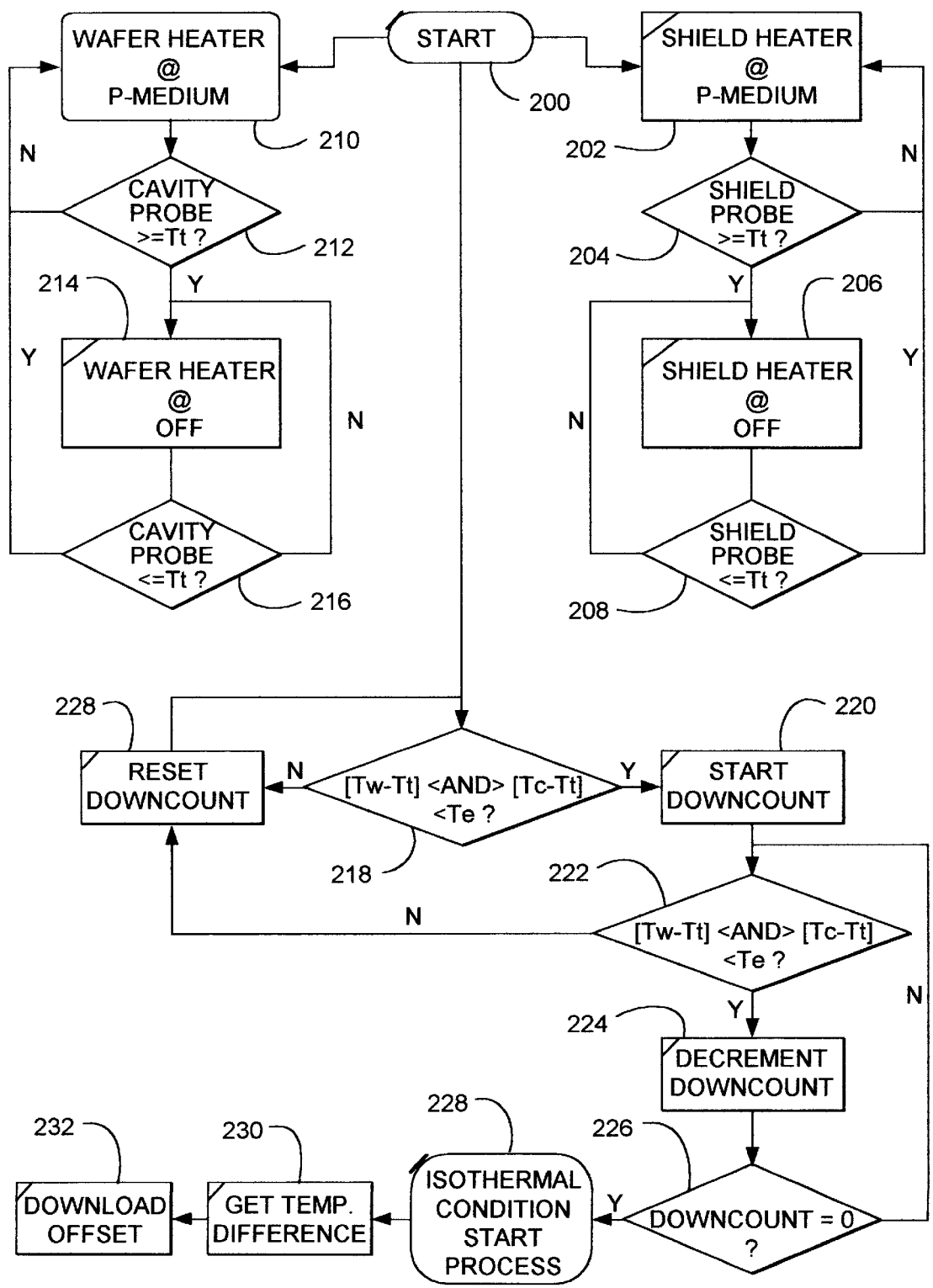
FIG. 6 is a process flow diagram showing the steps required to establish the isothermal condition shown in FIG. 5.

FIG. 6 is a process flow diagram showing the temperature control and monitoring steps corresponding to those shown in FIG. 5, and additionally, indicating how an offset, i.e., correction value for probe 110 is determined. The process begins at start block 200. Three parallel processes are initiated from start block 200. The processes starting with process 202 control the lower heater 44 identified as the shield heater. The processes commencing with process 210 control the upper heater 42 identified as the wafer heater. Finally, the processes commencing with decision 218 determine the onset of an isothermal condition and the calibration and storage of an offset. In process 202, the shield heater is placed at a medium power level. Control is then passed to decision 204 in which a determination is made as to whether the shield probe is registering a temperature greater than or equal the target temperature Tt. In the event this determination is in the negative, then control returns to process 202 and the shield heater is maintained at medium power level. Alternately, if an affirmative determination is reached, i.e., that shield probe temperature is greater than or equal to target temperature, then control is passed to process 206 in which the shield heater is turned off. Control is then passed to process 208. In process 208, a determination is made as to whether the shield probe is less than the target temperature. If this determination is in the negative, then control is returned to process 206. Alternately, if this determination is in the affirmative, then control is returned to process 202 in which the shield heater is returned to medium power level.

Control is also concurrently passed from start block 200 to process 210, in which the upper heater 42 identified as the wafer heater is placed at a medium power level. Control is then passed to decision 212 in which a determination is made as to whether the temperature registered by the cavity probe is greater than, or equal to the target temperature Tt. In the event this determination is in the negative, control returns to process 210. Alternately, if this determination is in the affirmative, then control is passed to process 214, in which the wafer heater is turned off. Control is then passed to decision 216, in which a determination is made as to whether the temperature registered by the cavity probe is less than or equal to the target temperature. In the event this determination is in the negative, then control returns to process 214 and the heater is maintained in the off condition. Alternately, if a determination in the affirmative is reached, i.e., that the cavity probe is registering at a temperature less than the target temperature, then control returns to process 210, in which the wafer heater is re-energized to a medium power level. A limitation of the control loop of processes 210–216 is that the wafer may severely overheat during power up due to a slow response of the cavity probe. Therefore, it may be desirable to modify the control loop. In an alternate embodiment, the wafer heater power will be coupled in terms of both power level and duration of power application to the shield heater power. Coupling should avoid the problem of severe overheating of the wafer heater, that might otherwise be brought about by the slow response time of the cavity probe. To avoid this potential problem the wafer heater could be subject to a control loop which requires that in seeking the target temperature, its power be limited to, no greater than 10% larger in amount and no greater than 10% longer in duration, than the power level and duration of the power applied to the, shield heater. As will be obvious to those skilled in the art there are many alternate power and durational regimes that will place both shield and wafer at an equilibrium condition about the target temperature, without departing from the teachings of this invention. For example, the power level need not be turned on and off, but rather can be increased or decreased in inverse relation, to the difference between the probe temperature and the target temperature.

Control is also concurrently passed from start block 200 to decision 218. In decision 218, a determination is made as to whether both the temperature measured by the shield probe and the cavity probe is within a pre-defined error factor, (Te), of the target temperature. In the event that this determination is in the affirmative, then control is passed to process 220. In process 220, a down count timer is initialized. The magnitude of the timer value is chosen so as to indicate with a high degree of confidence that at the expiration of the downcount a condition, which is both isothermal and equilibrium has been reached in the oven. Control is then passed to decision 222, in which a determination is made as to whether the temperature registered by the wafer and cavity probe is still within the pre-defined range Te of the target temperature Tt. In the event this determination is in the negative, then control is passed to process 228, in which the downcount value is reset and control is subsequently returned to decision 218. Alternately, if a determination in the affirmative is reached in decision 222, then control is passed to process 224, in which the value of the downcount is decremented. Control is then passed to decision 226 in which a determination is made as to whether the value of the downcount timer has reached 0. If this determination is in the negative, then control is returned to decision 222. Alternately, if this determination is in the affirmative, then control is passed to process 228. In process 228, an isothermal condition is indicated and a process is initiated. The process may be the processing of a wafer or the reading of a temperature offset for a probe, i.e., probe 110 on a calibration wafer. In this example, the process initiated is the calibration of an offset value indicative of the difference between the absolute and the relative temperature measured by a probe 110. In process 230, the difference in temperature registered by the wafer probe and either the shield or cavity probes is obtained. Since conditions in the isothermal cavity are isothermal, both the shield and cavity probes will indicate the same temperature. Control is then passed to process 232 in which the temperature difference is downloaded into the interface unit 100 and stored as an offset for probe 110. This downloaded value serves to permanently correct readouts from the calibration wafer and specifically probe 110 for the difference between the temperature registered by that probe and the absolute temperature experienced by the probe. The disadvantage to the particular method set forth in FIG. 6 for obtaining an isothermal condition, is that the cavity probe experiences only an exponential rate of rise. Therefore, at no time does the cavity probe actually reach the target temperature. The time to reach an isothermal condition is therefore exponentially long.

Figure 7:
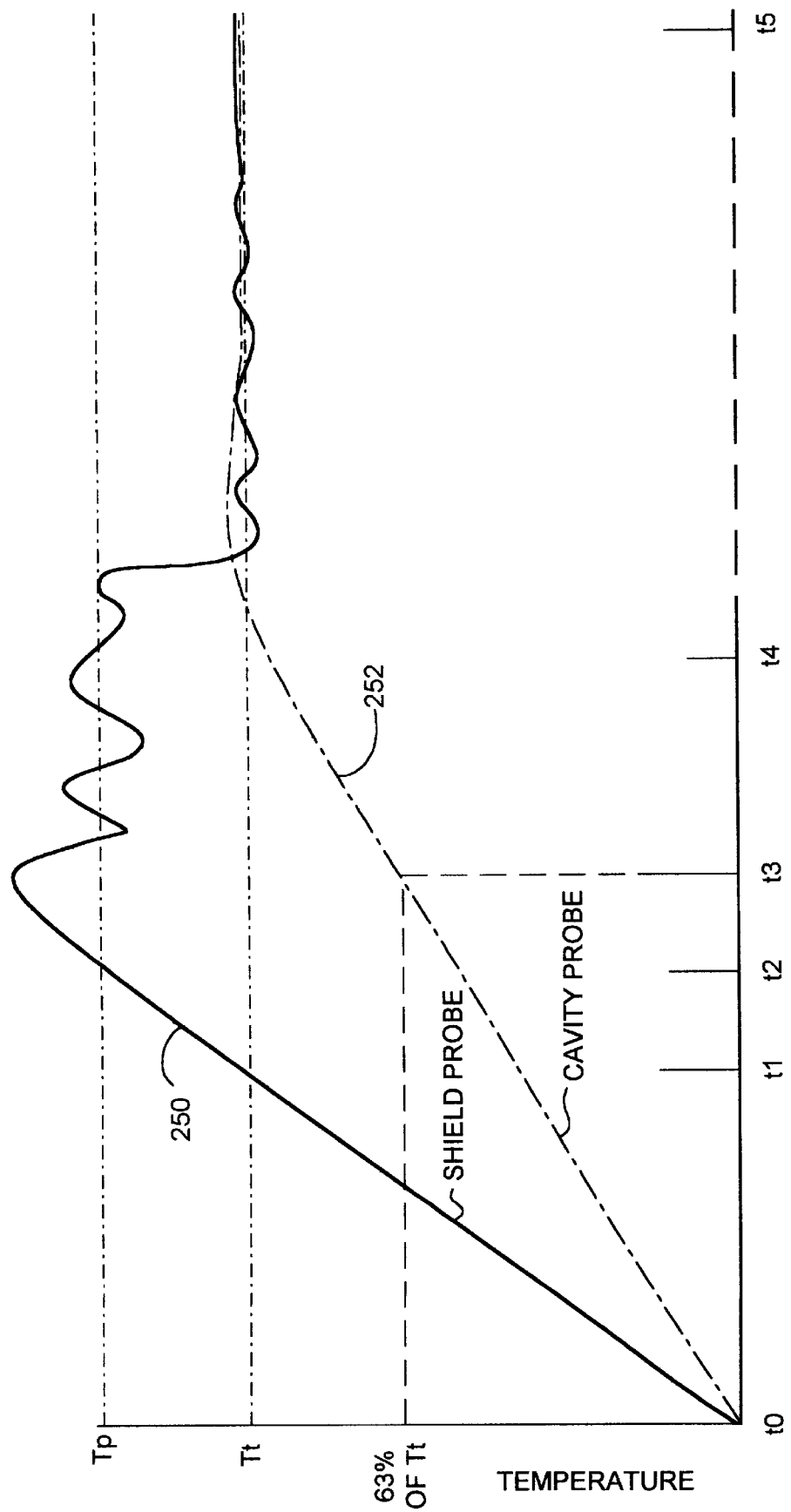
FIG. 7 is a graph showing temperature probe read-outs corresponding to an alternate method to that shown in FIG. 5, for establishing an isothermal equilibrium.

FIG. 7 shows graphically a method of more rapidly establishing an isothermal condition in the RTP. Feed forward control is utilized in conjunction with a preheat temperature (Tp) is utilized to shorten the time frame needed to bring the shield and wafer to an isothermal condition about target temperature Tt. Time is shown on a horizontal axis and temperature on a vertical axis. At time t0, both the cavity and the shield probes register an ambient condition. At time t1 the shield probe temperature has increased linearly to preheat temperature Tp. At time t2, the cavity probe has risen exponentially to a value of $(1-e^{-t})$, i.e., 63% of the target temperature Tt. At time t4, the cavity probe has exceeded the target temperature. At time t4, the temperature registered by the shield probe drops from the preheat temperature $T_p$ to the target temperature Tt. Preheating at a higher temperature than the target temperature has two advantages over the method shown and discussed above in connection with FIGS. 5–6. Not only does the cavity probe actually reach Tt, but also the time required to reach the isothermal condition is greatly reduced.

Figure 8:
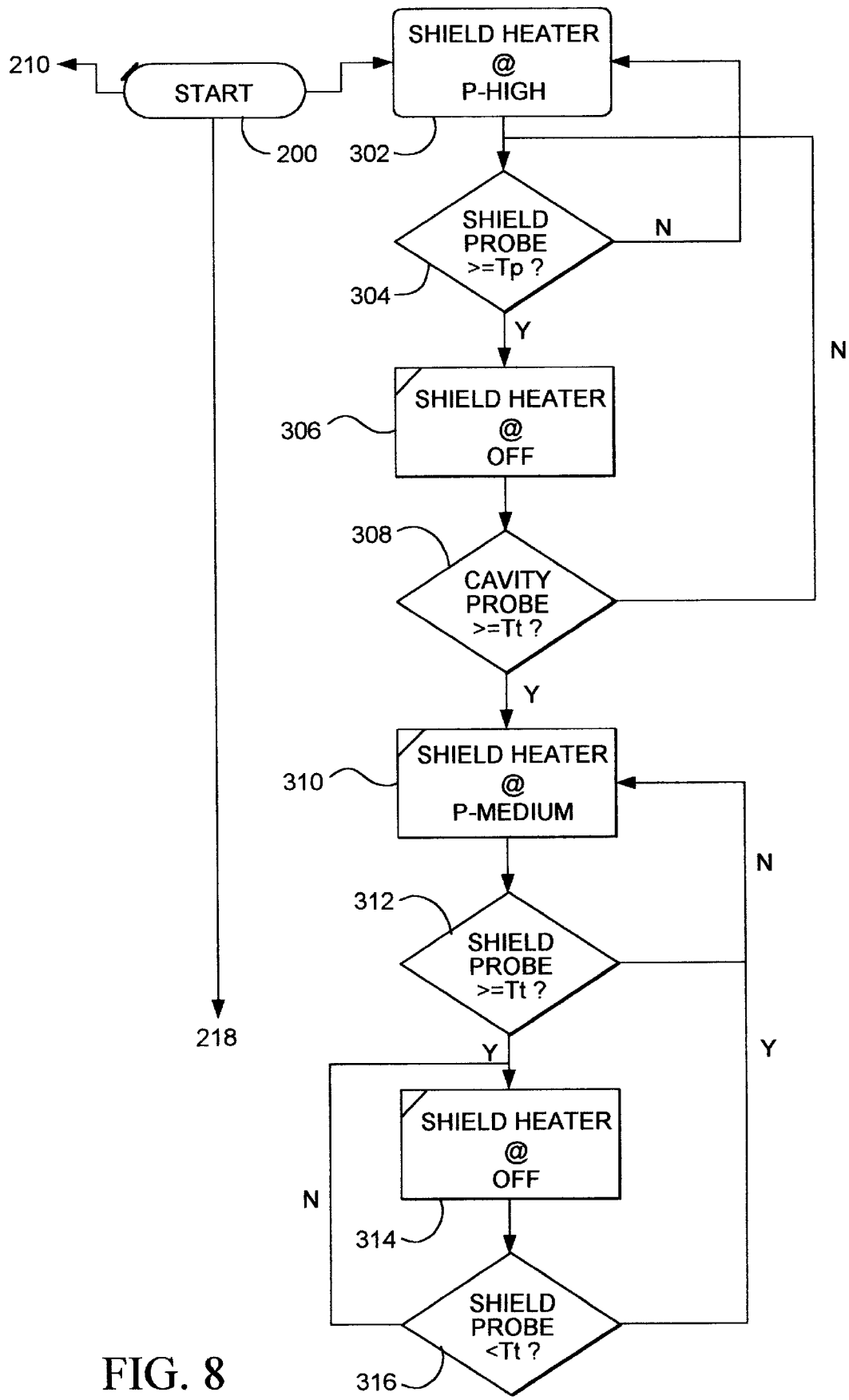
FIG. 8 is a process flow diagram showing the steps required to establish the isothermal condition shown in FIG. 7.

FIG. 8 is an alternative to the process shown in FIG. 6, specifically steps 202–208, for controlling the shield heater. The process commences at start block 200 and control then passes to process 302. In process 302, the shield heater is placed at a high power level. Control is then passed to decision 304, in which a determination is made as to whether the temperature registered by the shield probe is greater than or equal to the preheat temperature (Tp). If this determination is in the negative, then control returns to process 302. Alternately, if this determination is in the affirmative, then control is passed to process 306. In process 306, the shield heater is turned off and control is then passed to decision 308. In decision 308, a determination is made as to whether the cavity probe is registering a temperature greater than or equal to the target temperature Tt. If this determination is in the negative, then control returns to decision 304. Alternately, if this decision is in the affirmative then control passes to process 310. In process 310, the shield heater is placed at a medium power level. This produces the temperature transition shown at time t4 in FIG. 7. Control is then passed to decision 312, in which a determination is made as to whether the temperature measured by shield probe is greater than or equal to the target temperature Tt. In the event this determination is in the negative, then control returns to process 310. Alternately, if this decision is in the affirmative then control is passed to process 314. In process 314, the power applied to the shield heater is turned off. Control is then passed to decision 316. In decision 316, a determination is made as to whether the temperature registered by the shield probe is less than the target temperature Tt. If this determination is in the affirmative, then control returns to process 310 in which medium power level is re-applied to the shield heater. Alternately, if a decision in the negative is reached, control is passed to process 314. Thus, the utilization of a preheat regime allows an isothermal condition to be more readily established than is possible with the techniques shown and discussed above in connection with FIGS. 5–6. This shortens the time required for initiating a process carried out under isothermal conditions, such as those discussed above in connection with FIG. 6 and specifically processes 228–232.

Figure 9:
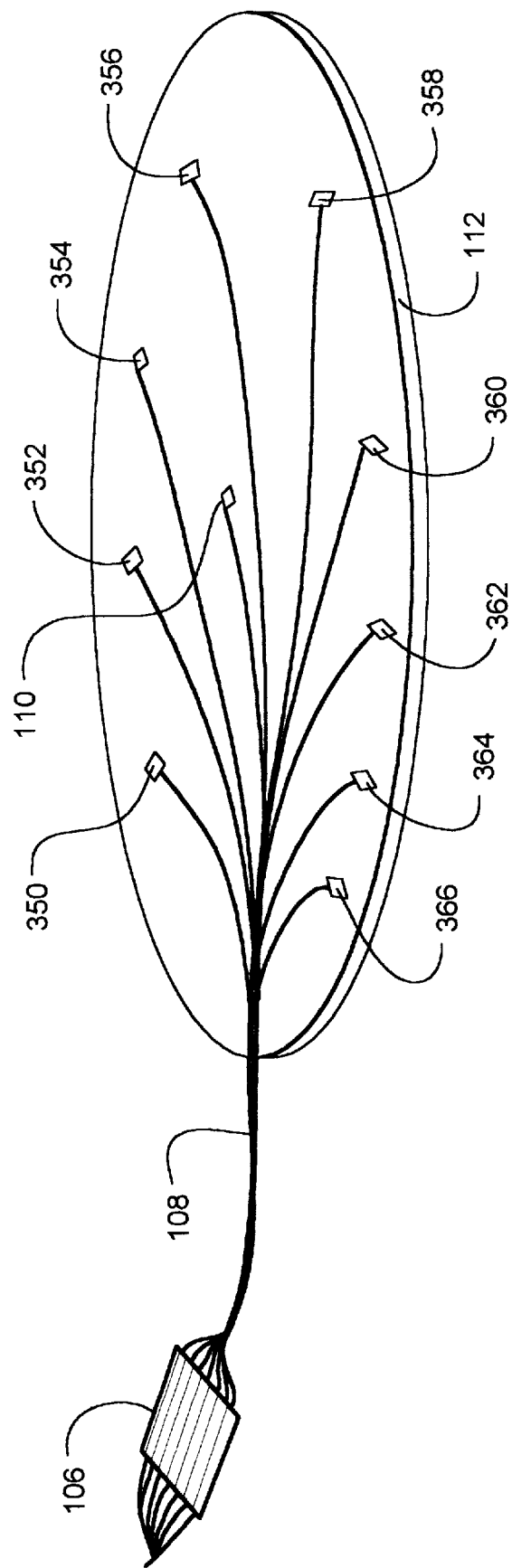
FIG. 9 is a hardware block diagram showing an instrumented semiconductor calibration wafer similar to that shown in FIG. 3, for profiling temperatures in a rapid thermal process oven.

FIG. 9 shows a calibration wafer 112 instrumented with a plurality of probes of which 110 and 350–366 are shown. These are connected via insulated lead wires of which 108 is referenced to gasket strip 106. Gasket strip 106 is in turn connected by an external lead 102 (not shown) to interface unit 100 (not shown). Utilizing the methods discussed above in connection with FIGS. 4–8, the absolute temperature offset can be obtained for each of these probes and can be stored in interface unit 100.

Figure 10B:
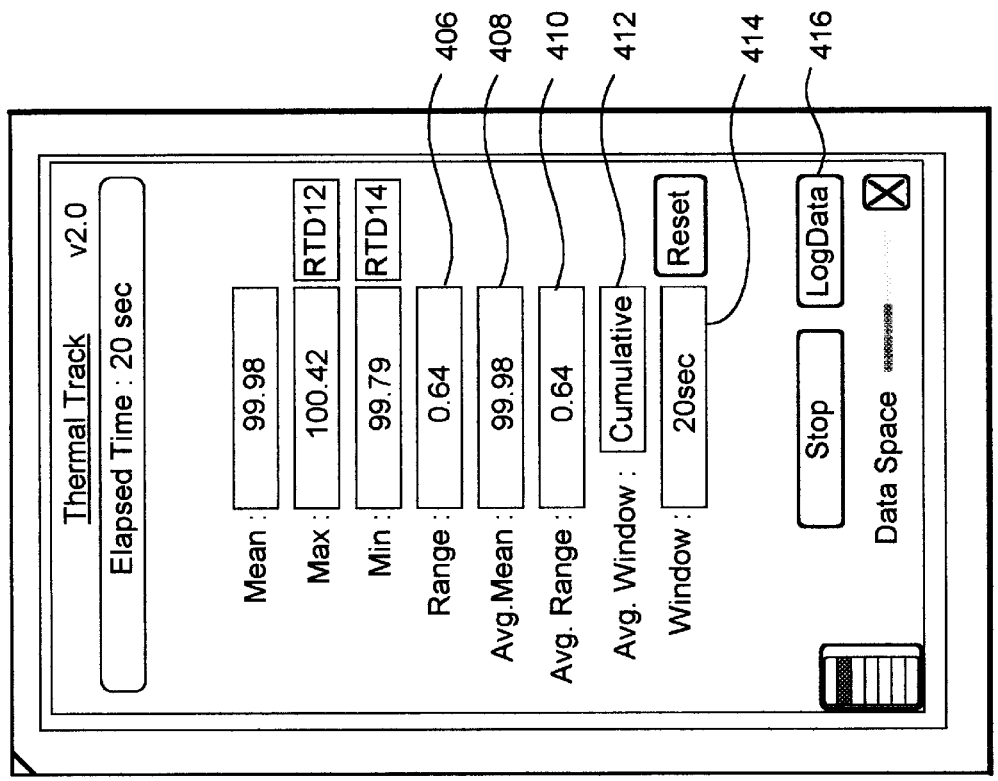
FIGS. 10A–B are screen interfaces associated with the instrumented calibration wafer shown in FIG. 9.
Figure 10A:
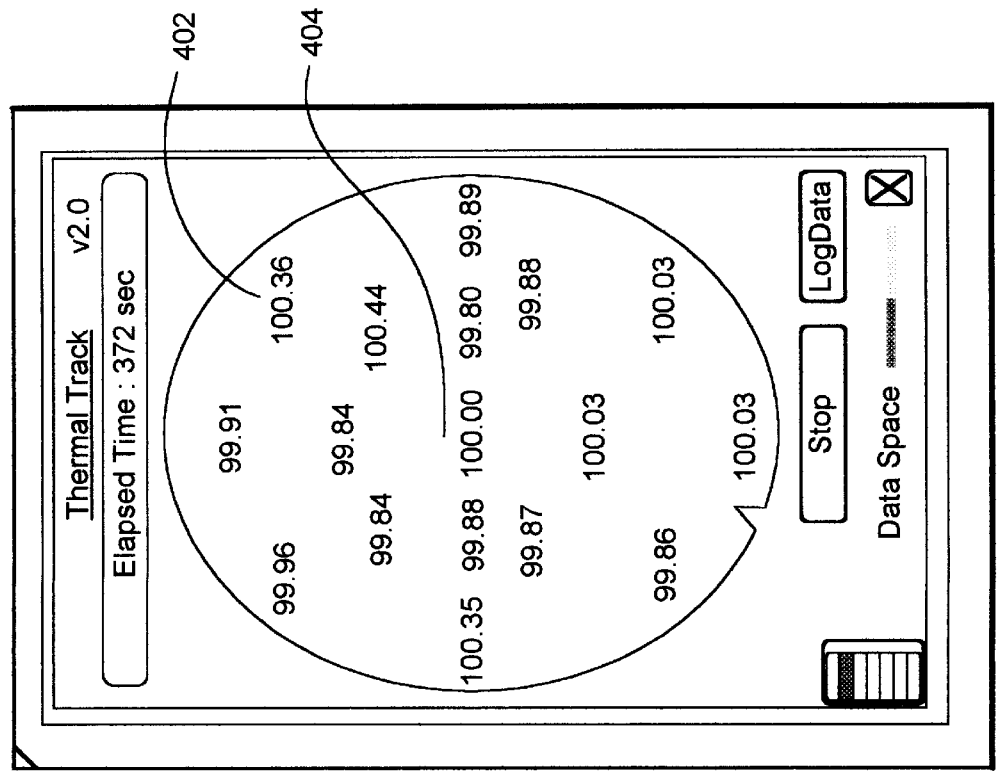

As shown in FIGS. 10A–B, the interface unit 100 operating in conjunction with software on the control unit 30 displays calibration wafer temperatures which are both relatively and absolutely accurate. FIG. 10A shows screen graphic 114, which is generated on the display 36 by the software associated with the calibration wafer. This screen display indicates, for all probe locations, the absolute temperatures in real time. The temperatures at point 402–404 are referenced and correspond respectively to the absolute value of the temperature registered by probes 358 and 110. In FIG. 10B, an alternate screen display 400 is shown. This display shows time weighted data for each of the probes on the calibration wafer shown in FIG. 9. As referenced, field 406 indicates the range between the maximum and minimum temperatures displayed. Field 408 indicates the average mean temperature. Field 410 indicates the time waited average range. Field 412 indicates that the averaging is a cumulative averaging. Field 414 indicates that the period of accumulation is 20 seconds. Finally, mouse selectable command button icon 416 enables the data displayed to be logged to disk or hard drive.

Non-Isothermal

Figure 17:
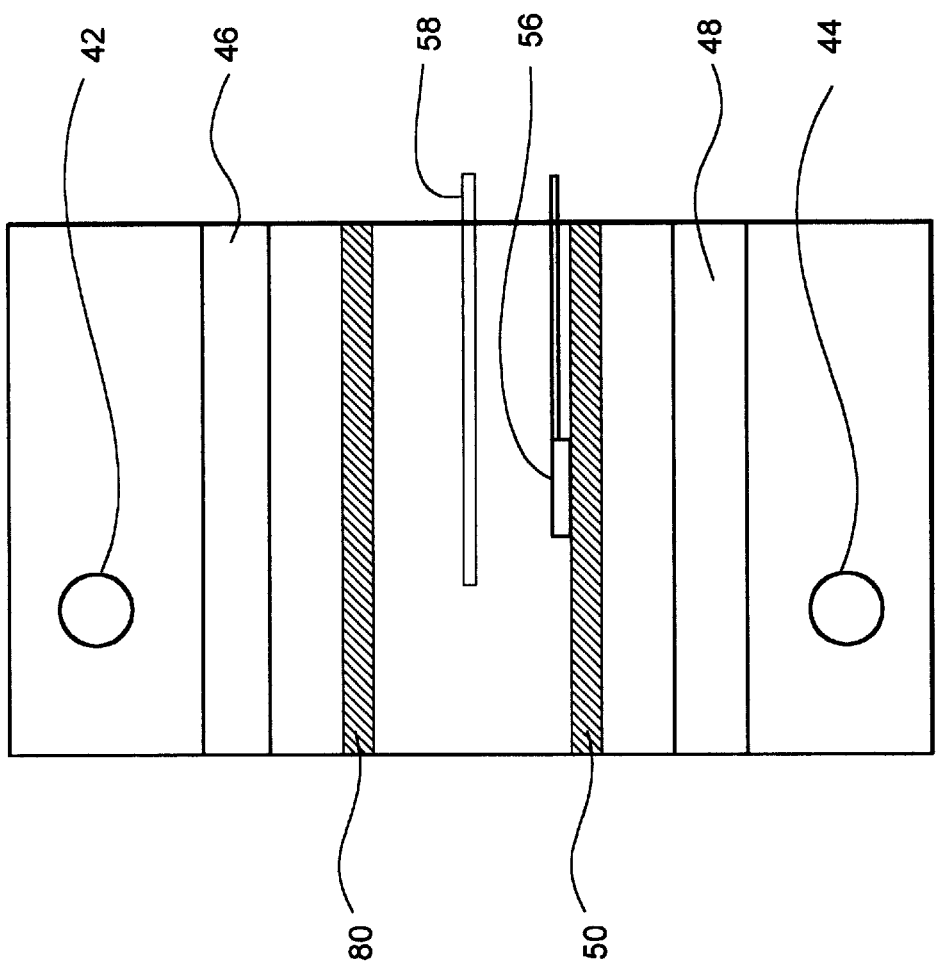
FIG. 17 is a cross-sectional view of the rapid thermal processing oven of FIG. 2 showing the hardware associated with controlling temperatures under non-isothermal conditions, in a calibrated oven during processing of a semiconductor wafer.
Figure 18:
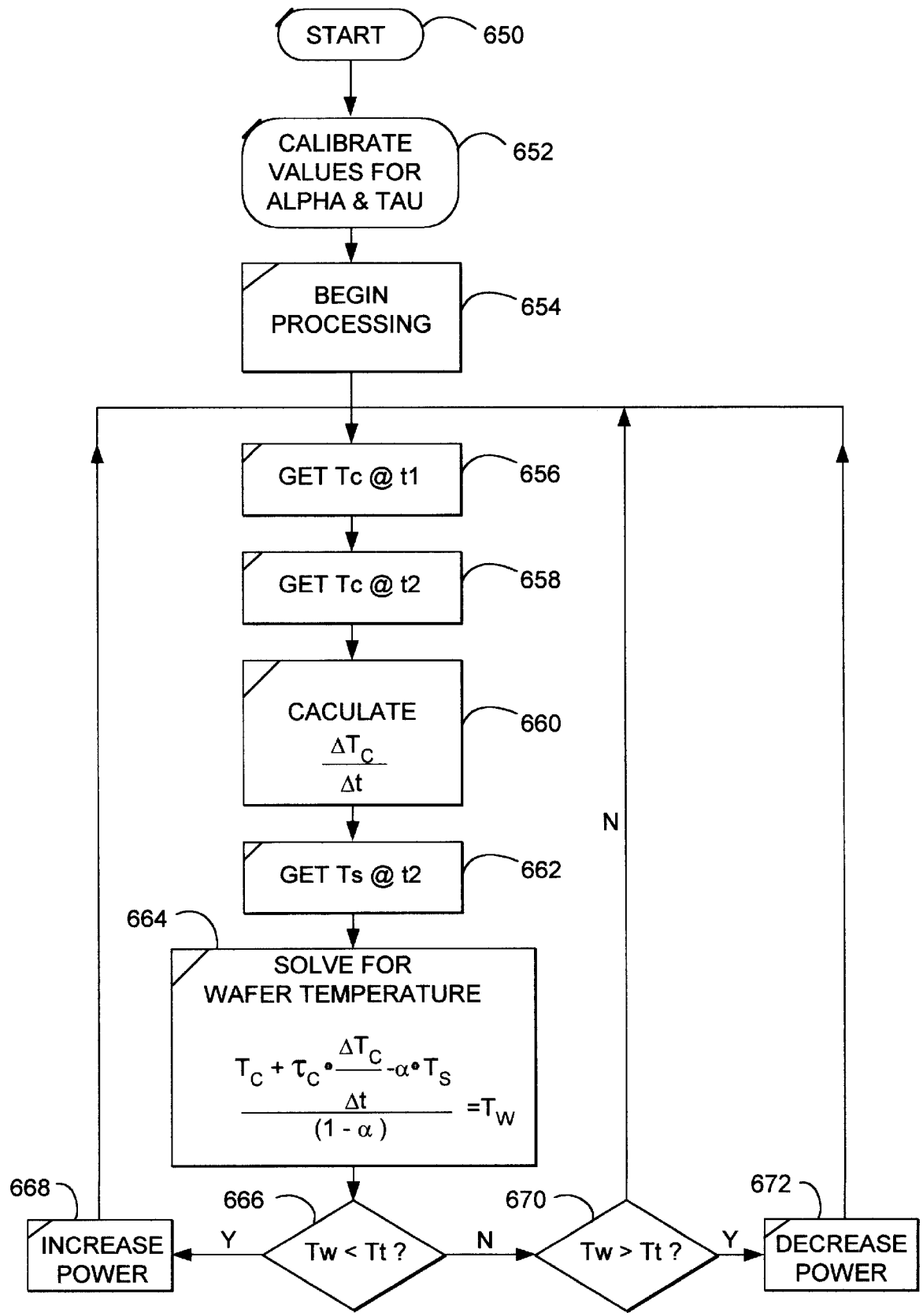
FIG. 18 is a process flow diagram showing the computational steps required to continuously recalculate the temperature $T_w$ of the semiconductor wafer during rapid thermal processing under non-isothermal equilibrium conditions.

Up to this point, the method and apparatus shown, have been dedicated to generating, monitoring, and controlling an isothermal environment. In FIGS. 11–18 method and apparatus shows the initial hardware set up associated with calibrating the cavity and shield probes for temperature monitoring under non-isothermal conditions. Non-isothermal monitoring requires a calibration process, separate from the control process. The calibration process and apparatus is shown in FIGS. 12–16. The control apparatus and process is shown in FIGS. 17–18.

Calibration

Figure 11:
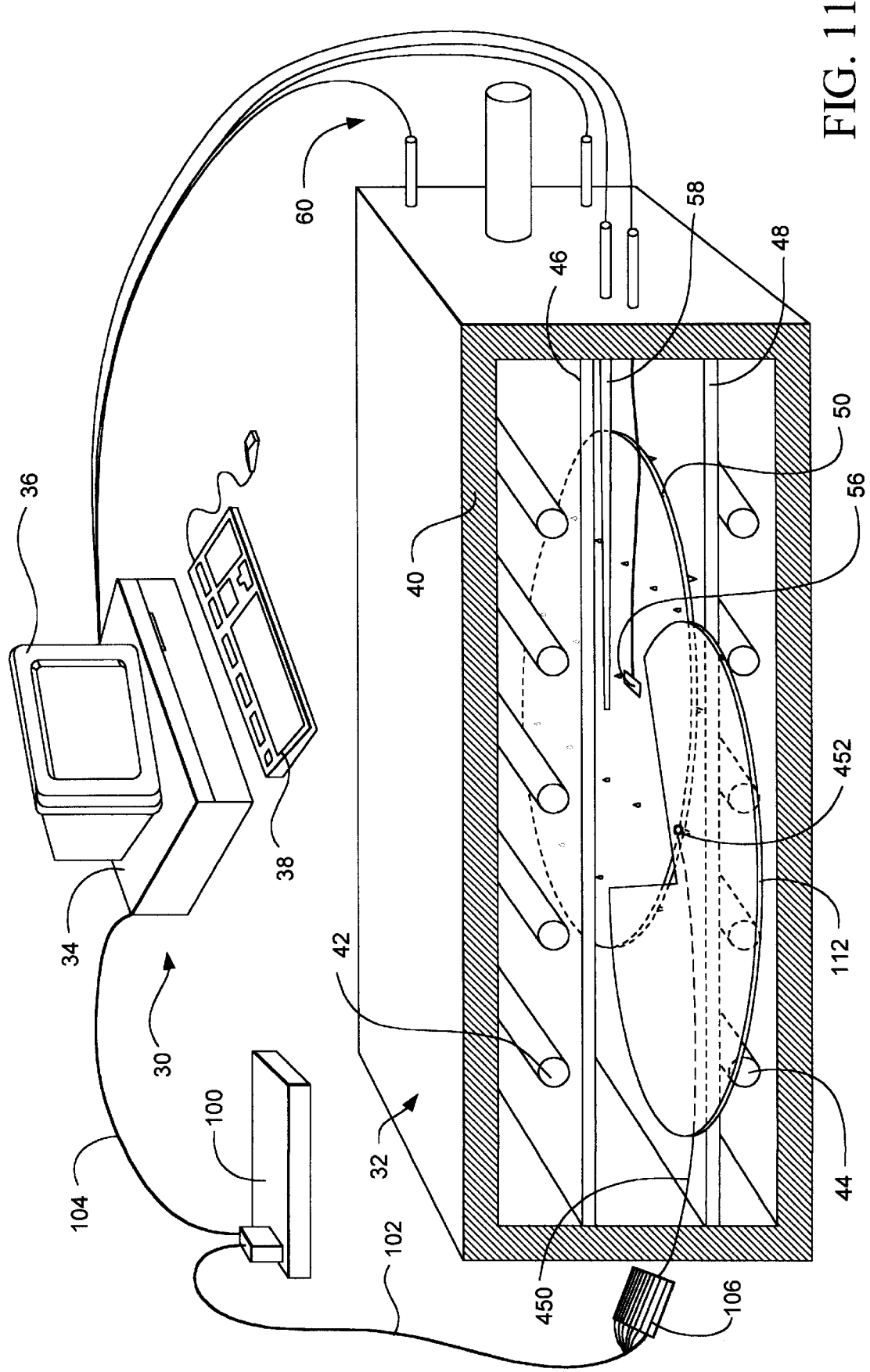
FIG. 11 is an overall hardware block diagram of the hardware associated with calibrating a rapid thermal processing oven for temperature monitoring under non-isothermal conditions.

FIG. 11 shows a calibration wafer identical in almost all respects to that shown and discussed above in FIG. 3. Significantly, however, the non-isothermal calibration probe 452 is shown mounted to the underside, i.e., the interior surface of the calibration wafer rather than the upper/exterior surface. The calibration probe 452 lies on the under side of instrumented wafer 112 in the isothermal cavity form between shield 50 and wafer 112.

Figure 12:
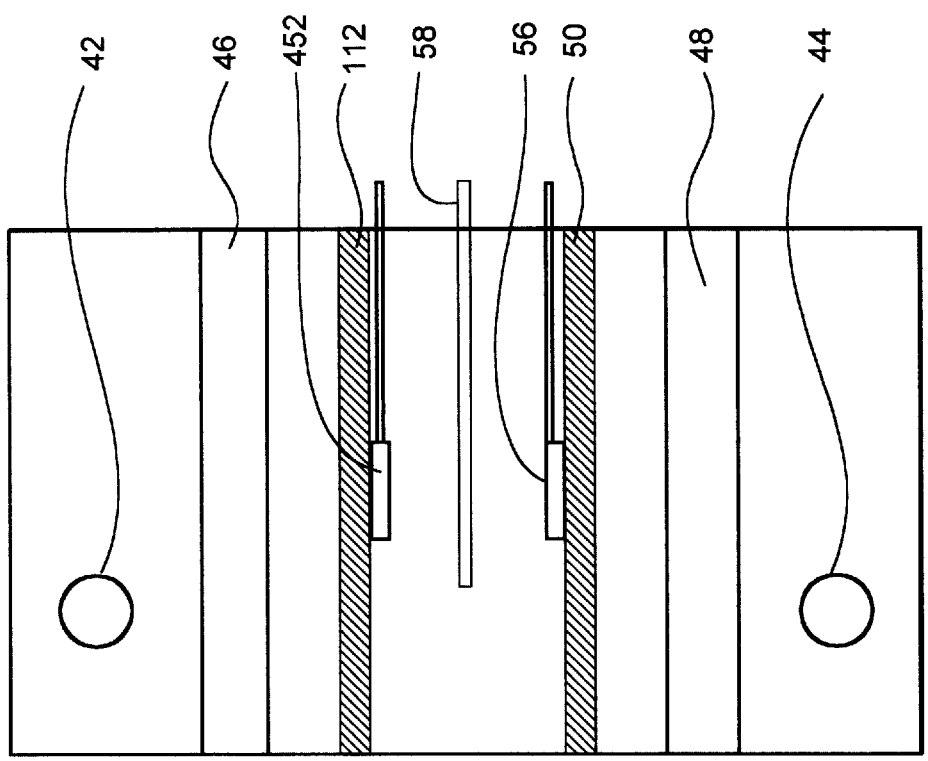
FIG. 12 is a cross-sectional view of the rapid thermal processing oven of FIG. 11 showing the hardware associated with a temperature calibration.

The probe layout of FIG. 11 is shown in greater detail in FIG. 12. An isothermal cavity is formed between the instrumented wafer 112 and the shield 50. The interior surfaces of the cavity formed by the lower surface of instrumented wafer 112 and the upper surface of shield probe 56 are instrumented. Wafer probe 452 is coupled to the underside/interior surface of the instrumented wafer. The wafer probe 452 is coupled to conformable gasket 106 by internal lead 450. The shield probe 56 is coupled to the topside/interior surface of the shield 50. The shield and wafer probes are shown tightly coupled to their respective wafers. The phrase "tightly coupled" refers to the thermal susceptibility of the probe. A probe is considered tightly coupled when it is primarily susceptible to emissions from, or the temperature of the specific object to which it is tightly coupled and is only negligibly susceptible to the temperature or emissivity of other surrounding objects. An object is considered loosely coupled when, as is the case with the cavity probe 58, it is displaced from the objects whose temperature it is measuring and is not primarily responsive solely to the emissivity or temperature of a single object, but rather is responsive to the temperature and emissivity of at least two objects. The cavity probe 58 is loosely coupled to both the wafer 112 and the shield 50, in the sense that it is responsive to the temperature of both the wafer and shield.

In order to calibrate the cavity and shield probes, 58 and 56 respectively, it is necessary to establish both the delayed constant tau and the coupling constant alpha for the probes. As set forth in the following FIGS. 13–15, it will be assumed that the only probe for which these calculations need be obtained is the cavity probe 58. As will be obvious to those skilled in the art, further procedures can be implemented, similar to those about to be shown and discussed, to derive correction factors for any imperfections in the coupling of the shield and wafer probes, as well.

Figure 13:
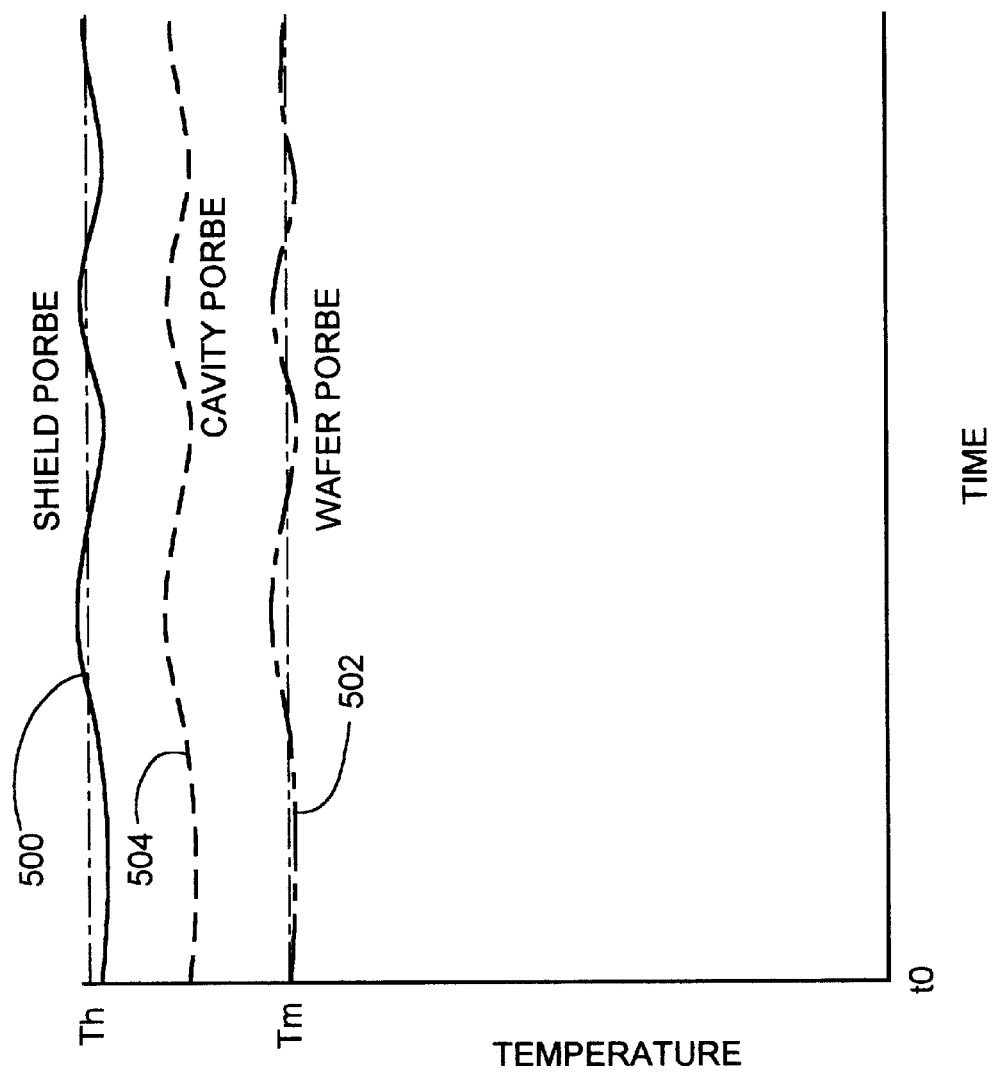
FIG. 13 is a graph showing the probe temperature read-outs necessary to establish a value for the constant alpha representative of the coupling ratio alpha for the cavity probe.

FIG. 13 is a graph showing the temperature profiles required to obtain the value for the coupling ratio alpha associated with the cavity probe 58. In the graph, time is plotted on a horizontal axis and temperature is plotted on a vertical axis. Three waveforms 500, 502, and 504 associated respectively with probes 56, 452, and 58 are shown. At time t0, the temperature registered by probes 56 and 452 has equilibrated at, respectively, a high temperature Th and a medium temperature Tm. Both temperatures Th-Tm are chosen within the range of temperatures which are expected to be encountered during RTP processing. Under these equilibrium conditions, the cavity probe will equilibrate at a temperature between Tm and Tp. Specifically the probe will equilibrate at a temperature which is closer to the shield temperature if the cavity probe is more tightly coupled to the shield than to the wafer. Alternately, the cavity probe will equilibrate at a temperature closer to the wafer if it more tightly coupled to the wafer than to the shield. Waveform 504, corresponding to the temperature registered by the cavity probe 58, has equilibrated at a temperature which is approximately 60% of the difference between the shield and wafer probes indicating that the cavity probe is more tightly coupled to the shield than to the wafer.

Figure 14:
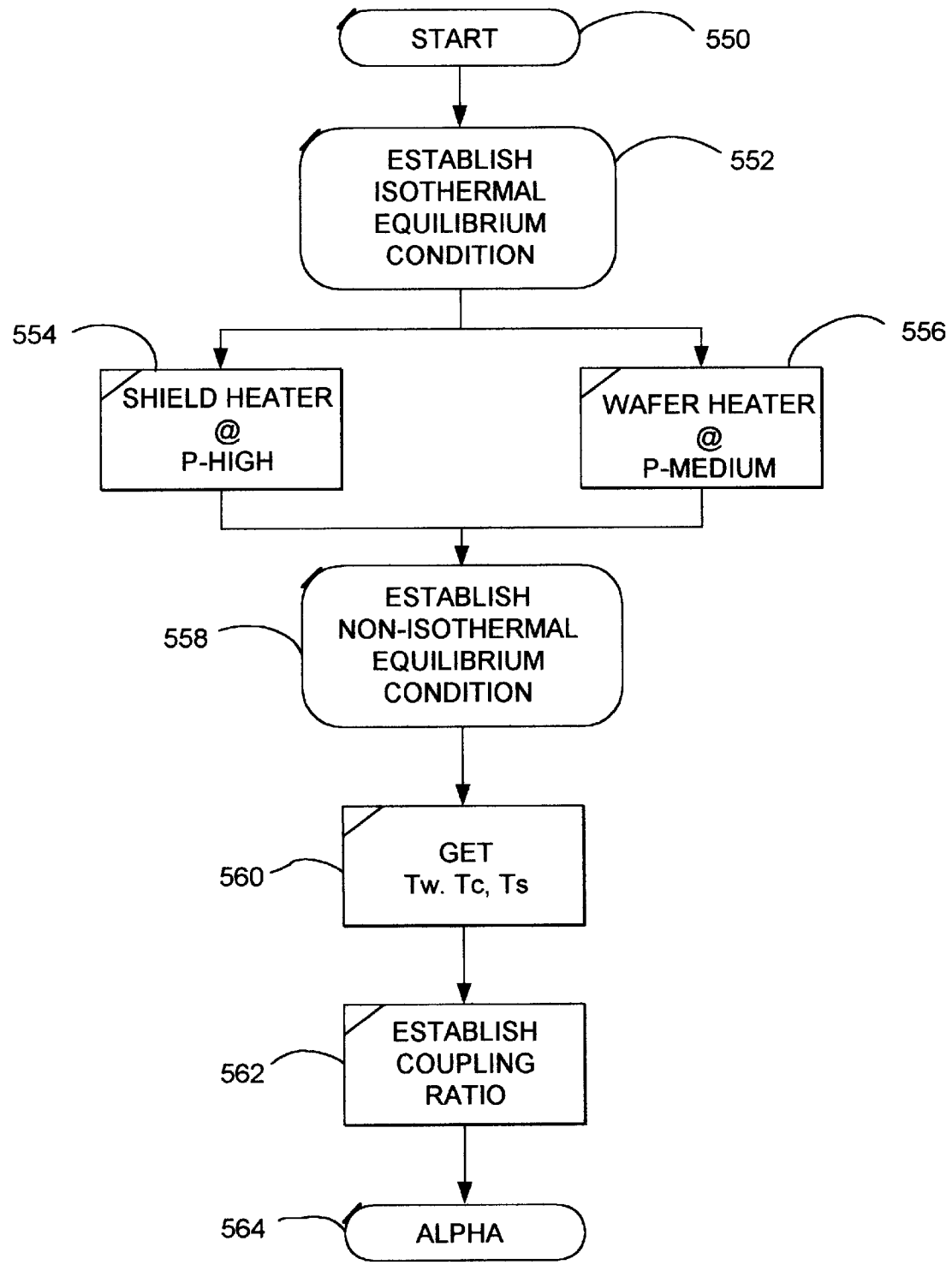
FIG. 14 is a process flow diagram showing the steps corresponding to establishing a value for alpha.

FIG. 14 is a process flow diagram of the steps associated with the determination of the coupling ratio alpha of the cavity probe 58 to the wafer 112 and the shield 50. From start process 550, control is passed to process 552. In process 552 an isothermal equilibrium condition is established. This can be accomplished in the manner discussed above in FIGS. 5–8. Control is then passed concurrently to both processes 554 and 556. In process 554, a high power level is applied to the shield heater referenced as 44 in FIG. 1. Control is then passed to process 558. In process 556, a medium power level is applied to the wafer heater referenced as 42 in FIG. 1. Control is then passed to process 558. In process 558 a non-isothermal equilibrium condition is established. This condition is indicated when, as shown in FIG. 13, the shield probe and wafer probes have equilibrated at, respectively, Th and Tm. Control is then passed to process 560. In process 560 the values registered by the wafer 452, cavity 58, and shield probe 56 are logged and stored in control unit 30. Control is then passed to process 562 in which the coupling ratio, derived from these three temperatures, is established. The coupling ratio is calculated as shown in the following example. Assume that under equilibrium conditions the temperatures registered by the shield, cavity and wafer probes are respectively 1,100° C., 1,060° C. and 1,000° C. The following equation can be solved for the alpha (α) resulting in a value of 60%.

$$T_C = (1-\alpha) \cdot T_W + \alpha \cdot T_S$$

1) 1st Order Approximation

Isothermal State

A value of α=60% indicates that the cavity probe is more tightly coupled to, more influenced by, the temperature of the shield than by the temperature of the wafer. Having established the coupling ratio alpha, control is then passed to process 564 in which the value for alpha is logged and stored in control unit 30.

Figure 15:
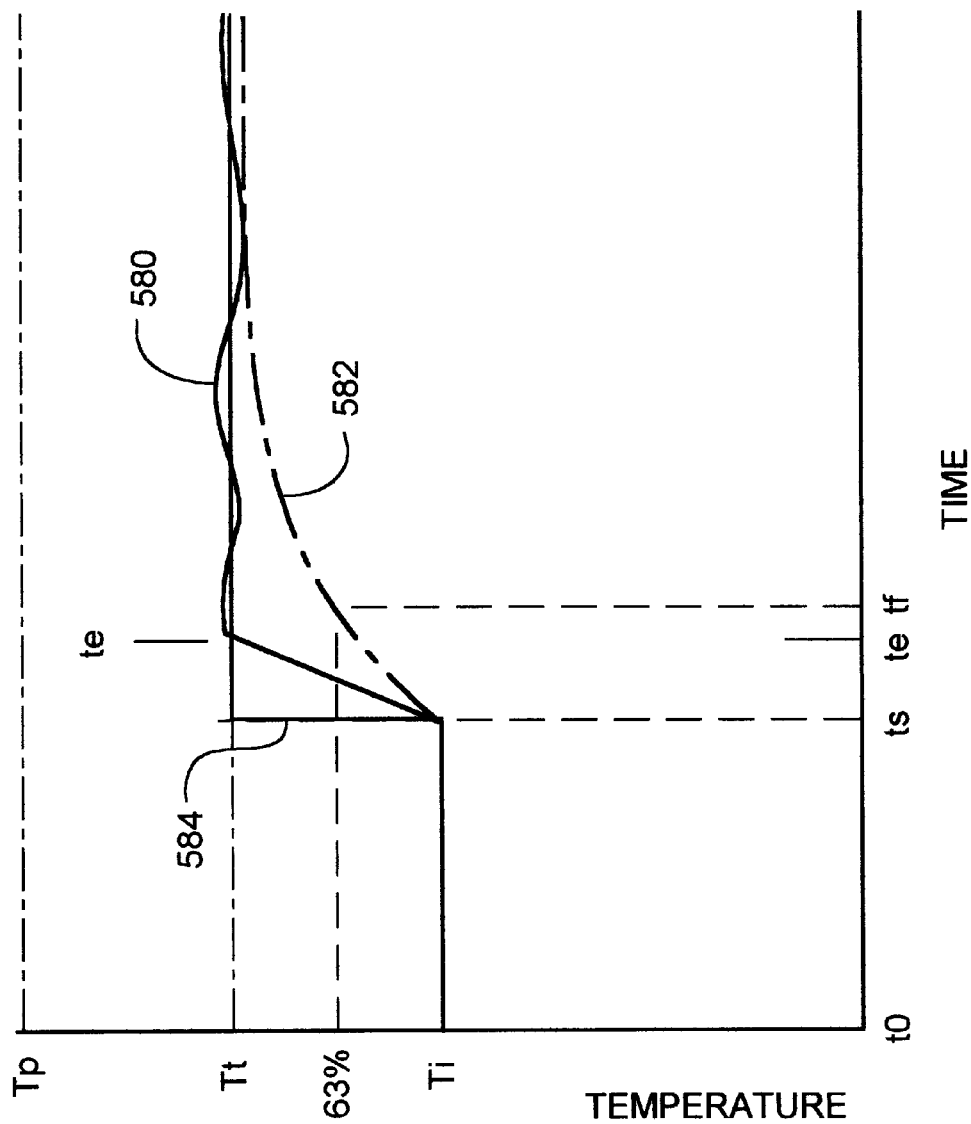
FIG. 15 is a graph showing the condition necessary to establish a value for the constant tau representative of the temperature delay associated with the cavity probe.

FIG. 15 is a graph showing the temperature profiles required to obtain the value for the time delay constant tau associated with the cavity probe 58. In the graph, time is plotted on a horizontal axis and the temperature is plotted on a vertical axis. Three waveforms 580, 582, and 584 are shown. Waveform 580 is associated with the shield and calibration probes 56 and 452. Waveform 582 is associated with the cavity probe 58. Waveform 584 represents an ideal step function temperature transition from an initial temperature Ti to the target temperature Tt. At time to, the temperature registered by all three probes 56, 58 and 452 has equilibrated at Ti. Ti is within the processing range of the target temperature Tt, and is of lesser magnitude. At time ts, the temperature registered by both the shield and wafer probes, 56 and 452 respectively, begins to transition from Ti toward the target temperature Tt. The transition is not an ideal step function and is not immediate. Such an ideal transition is indicated by waveform 584. Rather shield and wafer probes reach the target temperature Tt at time te as indicated by waveform 580. During the interval in which the shield and wafer probes temperature is increasing, the cavity probes temperature also increases. As indicated by waveform 582, the increase in the cavity probe temperature is exponential. At time tf, the temperature of the cavity probe has risen by approximately 63% or, $(1-e^{-t})$, from its initial value at ti. The temperature delay constant tau corresponds to this time delay. Tau is calculated by subtracting ts from tf and by subtracting an additional correction factor from the resultant. This additional correction factor corresponds to the extent to which the rate of rise of the shield and wafer probes indicated by waveform 580, deviates from the ideal step function indicated by waveform 584.

Figure 16:
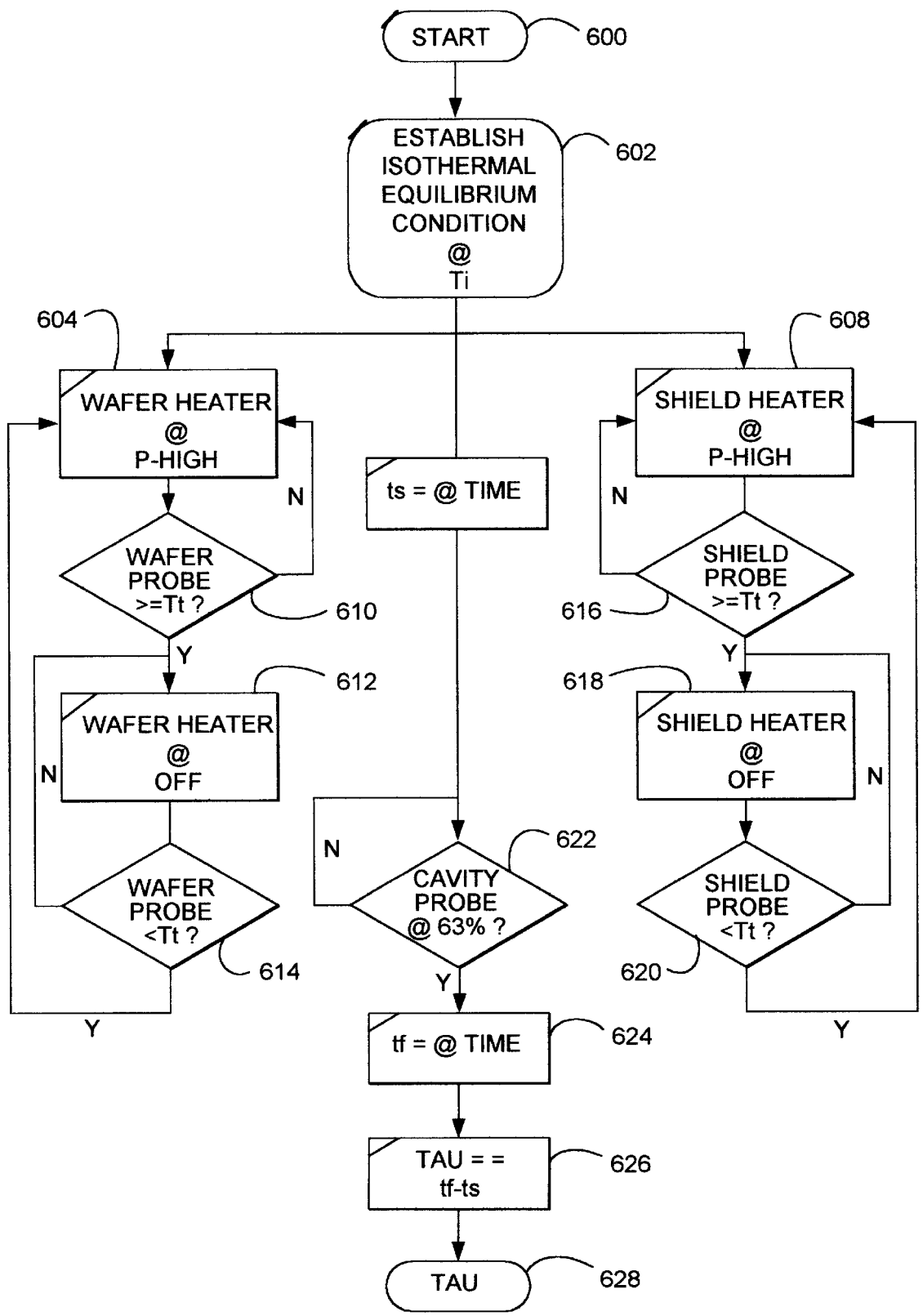
FIG. 16 is a process flow diagram showing the steps required to determine the value for tau.

FIG. 16 is a process flow diagram of the computational steps connected with the determination of tau. The process begins with start block 600 from which control is passed to process 602. In process 602, an isothermal equilibrium condition is established at an initial temperature Ti as shown in FIG. 15. The process for establishing the isothermal condition is shown and discussed above in FIGS. 5–8. Control is then passed in parallel to each of three difference concurrent processes initiated at process 604, 606 and 608, controlling respectively, the temperature of the upper heater 42; the calculation of tau, and the control of the lower heater 44.

The control of the wafer heater begins at process 604 in which a high power level is applied to the wafer heater 42. Control is then passed to decision 610. In decision 610, a determination is made as to whether the temperature registered by the wafer probe 452 is greater than, or equal to the target temperature Tt. If that determination is in the negative, then control returns to process 604. Alternately, if that decision is in the affirmative then control is passed to process 612. In process 612, the wafer heater is turned off. Control is then passed to decision 614. In decision 614, a determination is made as to whether the temperature indicated by the wafer probe is less than or equal to the target temperature. If this determination is in the negative, then control is returned to process 612. Alternately, if this decision is in the affirmative, then control is returned to process 604 in which the wafer heater is re-energized at a high power level.

The control of the shield heater 44 begins with process 608 in which a high power level is applied to the wafer heater. Control is then passed to decision 616. In decision 616, a determination is made as to whether the temperature registered by the shield probe 56 is greater than or equal to the target temperature Tt. If this determination is in the negative, control returns to process 608. Alternately, if this decision is in the affirmative control is passed to process 618. In process 618, the shield heater is de-energized. Control is then passed to decision 620. In decision 620, a determination is made as to whether the temperature registered by the shield probe is less than or equal to the target temperature Tt. If this determination is in the negative then control returns to process 618. Alternately, if this decision is in the affirmative, control returns to process 608, in which the shield heater is re-energized at a high power level.

Control is also passed concurrently from process 602 to process 606. In process 606 a time ts corresponding to the onset of the isothermal condition is logged and stored in control unit 30 shown in FIG. 1. Control is then passed to decision 622. In decision 622, a determination is made as to whether the temperature registered by the cavity probe 58 is within $(1-e^{-t})$, i.e,. 63% of the temperature differential between Tt and Ti. If this determination is in the negative then this decision is re-initiated. Alternately, if an affirmative decision is reached, i.e., that the temperature of the cavity probe has risen to the 63% level, (a.k.a. the exponential level) then control is passed to process 624. In process 624, the time tf at which the cavity probe reaches the exponential level is logged and stored in control unit 30. Control is then passed to process 626 in which the value of tau is calculated. This calculation involves subtracting Ts from Tf and subtracting from the resultant a correction factor to account of the extent to which the rate of rise of the shield and wafer probes deviates from the ideal step function 584, as shown in FIG. 15. Control is then passed to process 628 in which the value for tau is logged and stored in control unit 30. Control Having thus obtained, in the manner discussed above in connection with FIGS. 12–16, the values for the coupling constant alpha and the time delay constant tau associated with the cavity probe, it is now possible to process semiconductor wafers. The processing can be carried out under non-isothermal conditions. The processing can be carried out without any wafer probe. Only the shield and cavity probes are required. The mathematical justification for this state is as follows:

Let the temperatures of the probes, 56, 58, and 452 be denoted by the following variables:

$T_c$=Temperature registered by the Cavity Probe [temperature]

$T_s$=Temperature registered by the Shield Probe [temperature]

$T_w$=Temperature registered by the Wafer Probe [temperature]

Let the constants tau and alpha be denoted as follows:

α=Coupling Ratio of the Cavity Probe to the Shield Probe [ratio]

$\tau_c$=Exponential response time of Cavity Probe [time]

Let the time rate of change, i.e., the slope of the waveform associated with the cavity probe be represented by the following notation:

$$\frac{\Delta T_C}{\Delta t} = \text{Cavity Probe Temperature Slope [temp./time]}$$

Then:

As a first order approximation, we can state that the Wafer temperature is related to the cavity and shield temperatures as follows:

$$T_C + \tau_C \cdot \frac{\Delta T_C}{\Delta t} = (1-\alpha) \cdot T_W + \alpha \cdot T_S$$

2) 1st Order Approximation

Non-Isothermal State

The cavity temperature at any point in time, plus the product of the exponential constant tau and the time rate of change of the cavity temperature is equal to the sum of one minus the coupling constant alpa times wafer temperature and the product of alpha and the temperature of the shield. Since we were able to determine the value for alpha and tau as discussed above in connection with FIGS. 12–16, since we can monitor shield and cavity temperatures, it remains only to solve for the unknown, i.e., the value for the wafer temperature. Rearranging terms in the above equation results in the following equation which can be easily and repeatedly solved for Tw, the wafer temperature.

$$\frac{T_C + \tau_C \cdot \frac{\Delta T_C}{\Delta t} - \alpha \cdot T_S}{(1-\alpha)} = T_W$$

3) 1st Order Approximation

Non-Isothermal State

FIG. 17 shows the apparatus for controlling wafer temperature under non-isothermal conditions. The configuration is identical shown in FIG. 12, with one notable exception. The wafer 80, does not have, does not require a surface mounted probe in order to monitor its temperature. This is of tremendous advantage in semiconductor processing. The un-instrumented process wafer 80 and instrumented shield 50 define between them an isothermal cavity. In the cavity is positioned the cavity probe 58 and the shield probe 56. The cavity probe is between the semiconductor wafer and the shield. The shield probe is closely coupled to the shield. This set up is identical to that shown and discussed above in connection with FIG. 2.

The processing connected with remote monitoring of wafer temperatures is set forth in FIG. 18. Processing commences with start block 650. Control is then passed to process 652. In process 652, the values for alpha and tau are uploaded within control unit 30 and control is passed to process 654. In process 654 the real time processing associated with determination of the absolute value of wafer temperature Tw is commenced. Control is passed to process 656 in which the instantaneous temperature registered by the cavity probe Tc is obtained along with a value t1 corresponding to the time the temperature reading is taken. These values are stored in control unit 30. Then control is passed to process 658 in which, after an appropriate time interval, a second reading is obtained for the temperature of the cavity probe Tc along with the time t2 of the second reading. These values are also stored in control unit 30. Control is then passed to process 660. In process 660, the controller 30 calculates the rate of rise of temperature with respect to time based on the values obtained in processes 656 and 658. This establishes the extent to which the exponentially responsive cavity probe has proceeded toward or away from an equilibrium condition. Control is then passed to process 662. In process 662, a value for the temperature of the shield probe Ts is obtained along with the time t2 at which the temperature reading was taken. Control is then passed to process 664. In process 664 the control unit 30, takes the values discussed and obtained above and performs a calculation using the above-mentioned values to determine wafer temperature Tw. Control is then passed to process 666. In process 666, a determination is made as to whether the calculated temperature for the wafer Tw is below the target temperature Tt. In the event that determination is in the affirmative, then control is passed to process 668 in which power levels are increased to the upper and the lower heaters, 42–44 shown in FIG. 2. Control then returns to process 656 for a re-calculation of the temperature Tw of the wafer. Alternately, if in process 666 a decision is reached in the negative, then control is passed to decision 670. In decision 670 a determination is made as to whether the temperature of the wafer Tw is greater than the target temperature Tt. In the event this determination is in the affirmative then control is passed to process 672. In process 672, the power to the upper and lower heaters is decreased. Control then returns to process 656 for a re-calibration of the temperature Tw. Alternately, if in decision 670 a determination is made that the temperature of the wafer is not greater than the target temperature Tt, then control returns directly to process 656 for recalibration of the wafer temperature.

Alternative Probe Configurations

Figure 19B:
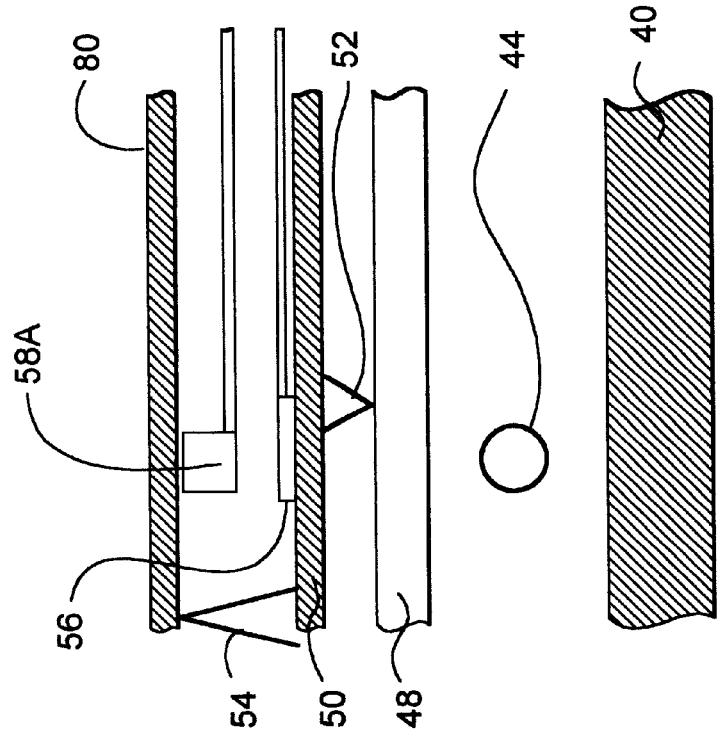
FIGS. 19A–D shows alternative embodiments for the cavity and shield probes shown in FIG. 17.
Figure 19A:
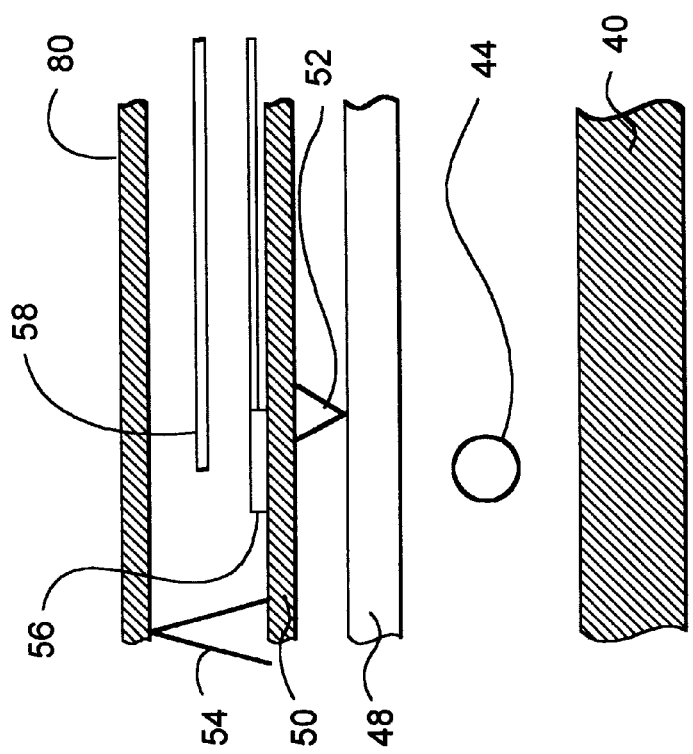
Figure 19C:
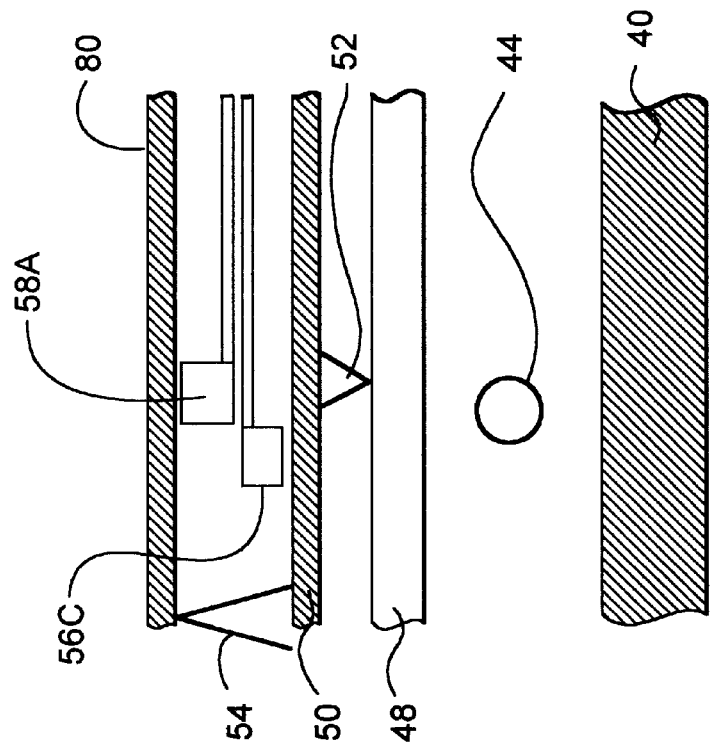
Figure 19D:
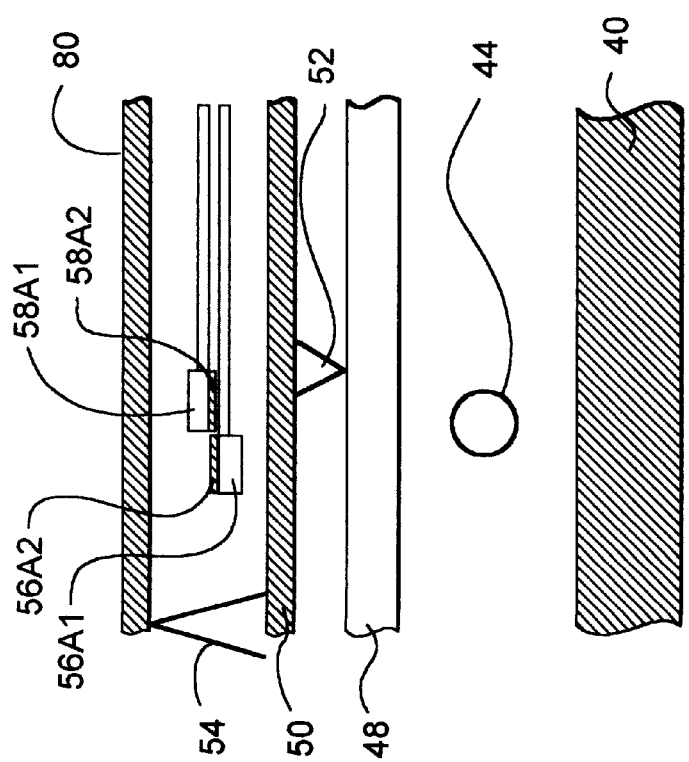

FIGS. 19A–D and FIGS. 20A–B indicate alternative probe arrangements for the shield and cavity probes. Any of these arrangements may be utilized to obtain either a temperature offset, establish an isothermal processing environment, or remotely monitor a process wafer. FIG. 19A shows the shield and cavity probe arrangement discussed above in connection with FIGS. 1–18. FIG. 19B shows an alternate arrangement in which cavity probe 58A is more closely coupled, by proximity to process wafer 80 than to shield 50. In FIG. 19C, the shield probe 56A1 is tightly coupled, but not in actual contact with shield 50. This result is achieved by virtue of a low emissivity coating 56A2 on the side of the probe distant from the shield, i.e., the side facing the wafer. Thus, although the predominant heat transfer mechanism effecting the probe is radiant energy, as opposed to conductive or convective, the probe is not effected by the radiant energy of the wafer which is reflected by coating 56A2. Correspondingly the cavity probe 58A1 is tightly coupled to the wafer 80 by virtue of a low emissivity coating 58A2 applied to the surface of the cavity probe which faces the shield 50. In FIG. 19D, another variation of cavity and shield probes is shown. In this configuration proximity, without contact, suffices to create differential probe coupling. The cavity probe 58A is placed adjacent the wafer while the shield probe 56C is placed adjacent to but not in actual physical contact with the shield 50. Thus, the cavity probe is more tightly coupled to the wafer than to the shield. Correspondingly, the shield probe is more tightly coupled to the shield than the wafer.

Figure 20B:
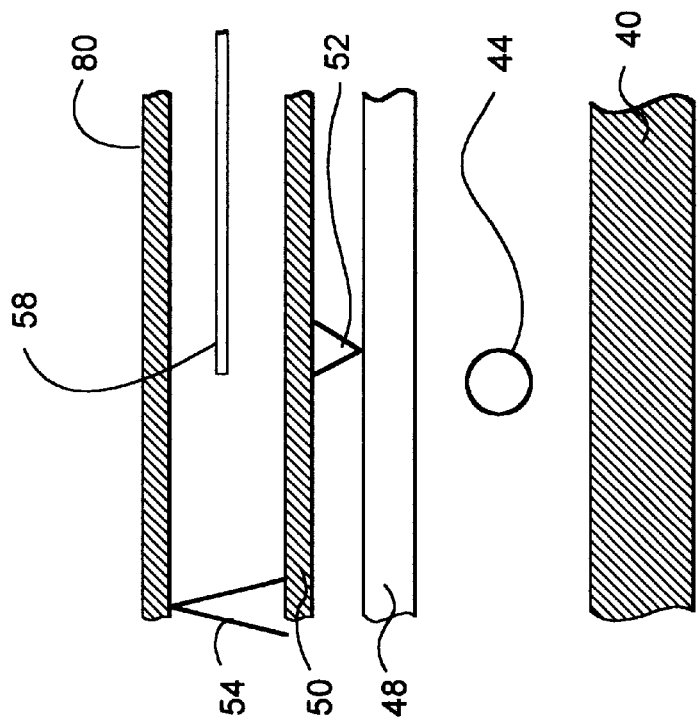
FIGS. 20A–B shows alternative embodiments for the shield probe shown in FIG. 17.
Figure 20A:
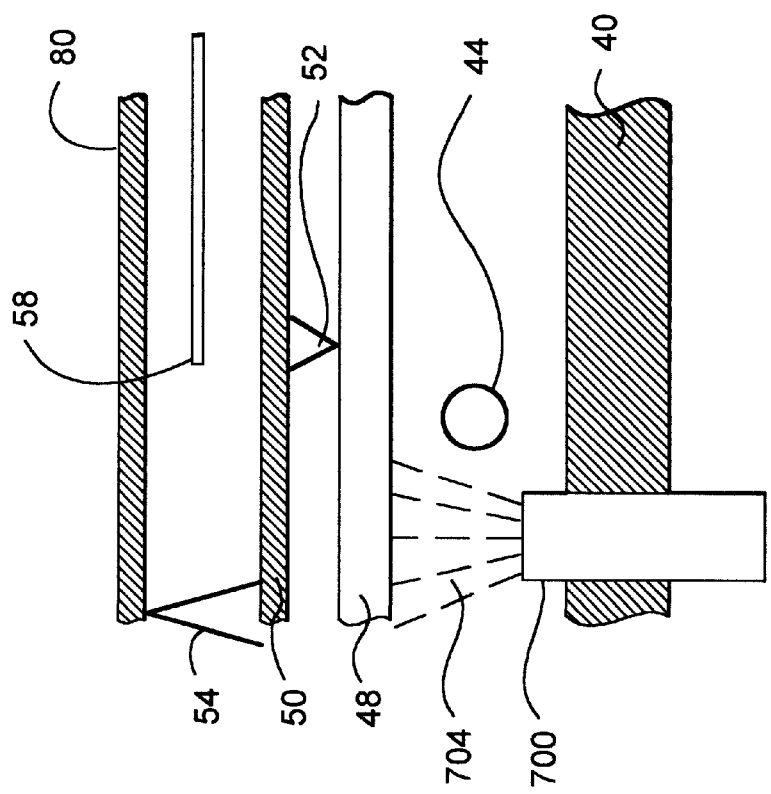

In FIGS. 20A–B, alternate embodiments are shown in which the shield probe is replaced by respectively a radiation sensitive pyrometer, and by electrical control of temperature utilizing the heater lamps. In FIG. 20A, a pyrometer 700 is, shown receiving radiation 704 through transparent quartz window 48 from the backside of shield 50. The cavity probe 58 is identical to that shown and discussed above. Most pyrometers operate in narrow bands and may be insensitive to the wavelength of the infrared heaters. In FIG. 20B, the cavity probe is positioned as shown in FIG. 19A, but the shield probe is non-existent. The temperature of the shield is monitored and controlled by virtue of the power level applied to lower heater 44.

The process and apparatus set forth herein, are applicable to temperature measurement and control in all process environments including in addition to RTP the following: Chemical Vapor Deposition (CVD), Epitaxial Reactors, HMDS vapor prime, PECVD, Plasma Strippers, PVD etc.

Although the foregoing invention has been described in detail for purposes of clarity of understanding, it will be obvious that certain modifications may be practiced within the scope of the appended claims.

What is claimed is:

1. An apparatus for measuring the temperature of an object within a process chamber, said chamber including a support for supporting the object in an object position and an energy source for transferring energy to the object, said apparatus comprising:
   a shield positioned in the process chamber adjacent the object position to receive from the energy source an amount of energy, said shield defining a cavity between itself and the object position;
   a first energy sensor positioned between said shield and the object position to measure the temperature of the object; and
   a second energy sensor to measure the temperature of said shield.

2. An apparatus for measuring the temperature of an object within a process chamber, said chamber including a support for supporting the object in an object position and an energy source for transferring energy to the object, said apparatus comprising:
   a wafer suitable for positioning in the chamber at said object position; an energy sensor positioned adjacent said wafer to measure an amount of energy transferred to said wafer by the energy source;
   an interface unit to receive from said energy sensor a measurement of the amount of energy transferred to said wafer, and said interface unit storing an offset value to convert the measurement obtained from the energy sensor to an absolute temperature.

3. The apparatus of claim 1, further comprising;
   a temperature controller for obtaining a first temperature reading from said first energy sensor and a second temperature reading from said second energy sensor and for determining the temperature of the object.

4. The apparatus of claim 1, further comprising;
   a third energy sensor positioned on a side of the object opposite said cavity to measure the temperature of said object.

5. The apparatus of claim 4, further comprising;
   a temperature controller for obtaining a first temperature reading from said first energy sensor, a second temperature reading from said second energy sensor, a third temperature reading from said third energy sensor and for determining a value corresponding to the amount of an offset required to convert said temperature reading obtained from said third energy sensor to a temperature value for the object.

6. The apparatus of claim 1, wherein said object includes a thermal profile and said shield comprises a thermal profile similar to the thermal profile of the object.

7. The apparatus of claim 6, wherein the thermal profiles of the object and said shield include opacity to wavelengths in the range of between about 0.5 $\mu$m, and about 20.0 $\mu$m.

8. The apparatus of claim 1, wherein said first energy sensor comprises a thermocouple.

9. The apparatus of claim 1, wherein said second energy sensor comprises a thermocouple.

10. The apparatus of claim 1, wherein said second energy sensor comprises a pyrometer.

11. The apparatus of claim 1, wherein said second energy sensor comprises:
    an energy controller configured to control the temperature of said shield by applying a predefined amount of energy from said energy source to said shield.

12. The apparatus of claim 1, wherein the first energy sensor compressively contacts the object.

13. An apparatus for measuring the temperature of an object within a process chamber, said chamber including a platform for receiving the object and an energy source for transferring energy to the object, said apparatus comprising:
    a shield positioned in the process chamber adjacent the platform for defining an isothermal cavity between the object and said shield;
    a first energy sensor positioned between said shield and the platform to measure the temperature of the object; and
    a second energy sensor to measure the temperature of said shield.

14. A method for establishing an isothermal condition within a process chamber, said process chamber including a platform for receiving an object, a shield adjacent the platform and an energy source for transferring energy to the object and the shield, said method comprising:
    selecting a target temperature at which to establish the isothermal condition;
    obtaining a first temperature measurement corresponding to the shield temperature;
    varying an energy level applied by the energy source to the shield in inverse relationship to the difference between the first temperature and the target temperature;
    obtaining a second temperature measurement corresponding to a combination of the temperatures of the shield and the object;
    varying the energy level applied by the energy source to the object in inverse relationship to the difference between the second temperature and the target temperature; and
    indicating an isothermal condition, when the first and the second temperature measurements are both within a predetermined range of the target temperature.

15. A method for establishing an absolute temperature value for a temperature sensor on an object within a process chamber, said process chamber including a platform for receiving the object, a shield adjacent the platform and an energy source for transferring energy to the object and the shield, said method comprising:
    selecting a target temperature;
    obtaining a first temperature measurement corresponding to the shield temperature;
    varying a power level applied by the energy source to the shield in inverse relationship to the difference between the first temperature and the target temperature;
    obtaining a second temperature measurement corresponding to a combination of the temperatures of the shield and the object;

varying the power level applied by the energy source to the object in inverse relationship to the difference between the second temperature and the target temperature; and obtaining a third temperature measurement from said temperature sensor, when the first and the second temperature measurements are both within a predetermined range of the target temperature; and determining an offset value for the temperature measured by said temperature sensor, such that said offset value corresponds to the difference between said third temperature measurement and said target temperature.

16. A method for monitoring the temperature of an object within a process chamber, said process chamber including a platform for receiving the object, a shield adjacent the platform and an energy source for transferring energy to the object and the shield, said method comprising:

correlating the temperature of the shield $T_s$, the object, and a first temperature sensor positioned between said shield and said object to obtain a coupling ratio $\alpha$ for said first temperature sensor;

correlating the time rate of change $\Delta T_c/\Delta t$ in the temperature $T_c$ of said first temperature sensor in relation to the temperature of said shield and said object to obtain the response time $\tau_c$ for said first temperature sensor; and determining the temperature of said object $T_w$ on the basis of a formula correlating the coupling ratio, the response time, and readings obtained from the first and second temperature sensors.

17. The method of claim 16, wherein said formula comprises:

$$\frac{T_C + \tau_C \cdot \frac{\Delta T_C}{\Delta t} - \alpha \cdot T_S}{(1 - \alpha)} = T_W.$$

18. The method for monitoring the temperature of an object of claim 17, wherein:

said step of correlating to obtain a coupling ratio $\alpha$ further includes the steps of:
 a) establishing a non-isothermal equilibrium condition about the object and the shield, wherein said shield and the object are at different temperatures;
 b) obtaining, from a temperature sensor positioned between said shield and said object, a first temperature measurement; and said step of correlating to obtain a response time $\tau_c$ for said first temperature sensor includes the steps of:
 c) establishing an isothermal condition about the object and the shield, wherein said shield and said object are at an initial temperature;
 d) elevating the temperature of the shield and the object to a final temperature;
 e) initiating said elevating step by obtaining a second temperature measurement, from the first temperature sensor and recording the time of said second measurement;
 f) determining at what time a temperature measured by said first temperature sensor has risen to a range of between about 53% and about 73% of the difference between the initial and the final temperature.

19. A method for measuring the temperature of an object, comprising the steps of:

mounting the object in a chamber, mounting a shield parallel to it and spaced from it, mounting a first temperature sensor in between the object and the shield;

measuring the temperature of the shield with a second temperature sensor, mounted in between the object and the shield;

heating the object and the shield to make the temperature of the first and second temperature sensor equal; and recording the temperature indicated by the first sensor and the second sensor.

20. A method for measuring the temperature of an object, comprising the steps of:

mounting the object in a chamber, mounting a shield parallel to the object and spaced from it, mounting a first temperature sensor in between the object and the shield, controlling the temperature of the shield with a calibrated amount of heating energy supplied to it;

heating the object and the shield to make the temperature of the first sensor equal to the controlled temperature of the shield, to generate an isothermal cavity between the object and the shield; and recording the temperature as indicated by the sensor.

21. A method for measuring the temperature of an object, comprising the steps of:

mounting the object in a chamber, mounting a shield parallel to the object, mounting a temperature sensor in between the object and the shield;

measuring the temperature of the shield with a pyrometer, viewing the shield from the side not facing the object;

using means for separate heating of the object and of the shield to equalize the temperature of the sensor and the shield, and to generate an isothermal cavity between the object and the shield; and recording the temperature as indicated by the sensor and the pyrometer.

22. A method for measuring the temperature of an object, comprising the steps of:

mounting the object in a chamber, mounting a shield spaced apart from the object, mounting a first temperature sensor in between the object and the shield;

measuring or controlling the temperature of the shield; and recording the temperature of the shield and of the first temperature sensor and using it to calculate the temperature of the object.

23. An apparatus for measuring the temperature of an object within a process chamber, said chamber including a support for supporting the object in an object position and an energy source for transferring energy to the object, said apparatus comprising:

a wafer suitable for positioning in the chamber at said object position;

a relative wafer temperature sensor positioned adjacent said wafer to measure an amount of energy transferred to said wafer by the energy source;

an interface unit to receive from said relative wafer temperature sensor a measurement of the relative temperature of said wafer, and said interface unit storing an offset value to convert the measurement obtained from the relative wafer temperature sensor to an absolute wafer temperature.

* * * * *